United States Patent [19]

Jones

[11] Patent Number: 5,461,492
[45] Date of Patent: Oct. 24, 1995

[54] FILM SCANNER WITH IN-LINE DUAL SCANNING GATES

[75] Inventor: Robert S. Jones, Rochester, N.Y.

[73] Assignee: Eastman Kodak Company, Rochester, N.Y.

[21] Appl. No.: 201,282

[22] Filed: Feb. 16, 1994

[51] Int. Cl.⁶ .................................................. H04N 1/04
[52] U.S. Cl. .................. 358/487; 358/474; 358/496; 358/498; 358/506; 353/95; 355/75
[58] Field of Search ......................... 358/471, 474, 358/487, 492, 494, 496, 498, 505, 506, 527; 355/75; 353/95

[56] References Cited

U.S. PATENT DOCUMENTS

| | | | |
|---|---|---|---|
| 3,644,038 | 2/1972 | Uddgren | 355/75 |
| 4,858,003 | 8/1989 | Wirt et al. | 358/102 |
| 5,093,734 | 3/1992 | Gerlach | 358/487 |
| 5,111,241 | 5/1992 | Kralles | 355/75 |
| 5,155,596 | 10/1992 | Kurtz et al. | 358/214 |
| 5,162,840 | 11/1992 | Benker et al. | 355/32 |

Primary Examiner—Scott A. Rogers
Assistant Examiner—Thomas D. Lee
Attorney, Agent, or Firm—David M. Woods

[57] ABSTRACT

A film scanner for digitizing film image frames having dual, in-line negative filmstrip and slide scanning gates on a scanning gate frame movable to position the selected scanning gate in a scanning station. The film scanner includes a film scanning station, an insertion slot for receiving the filmstrip, a filmstrip pre-positioning station a filmstrip for scanning while a previous filmstrip is being scanned, an ejection slot, and a diverter for diverting the scanned filmstrip out the ejection slot and allowing the advancement of the pre-positioned filmstrip into the filmstrip scanning gate. The pre-positioned filmstrip is advanced in a forward direction through the diverter and filmstrip scanning gate, as the scanning station performs a low resolution pre-scanning of the image frames. Then the pre-scanned filmstrip is advanced in the reverse direction into the filmstrip scanning gate, clamped in place, and the filmstrip scanning gate is translated more slowly through the scanning station which performs a high resolution main-scanning of the image frames. The scanning gate frame is also movable by the carriage drive motor to position and translate the slide scanning gate through the scanning station during pre-scan and main-scan operations. Jaws of the slide scanning gate receive slide mounts varying in width and thickness and to center the slide film image frame in the film scanning plane.

17 Claims, 13 Drawing Sheets

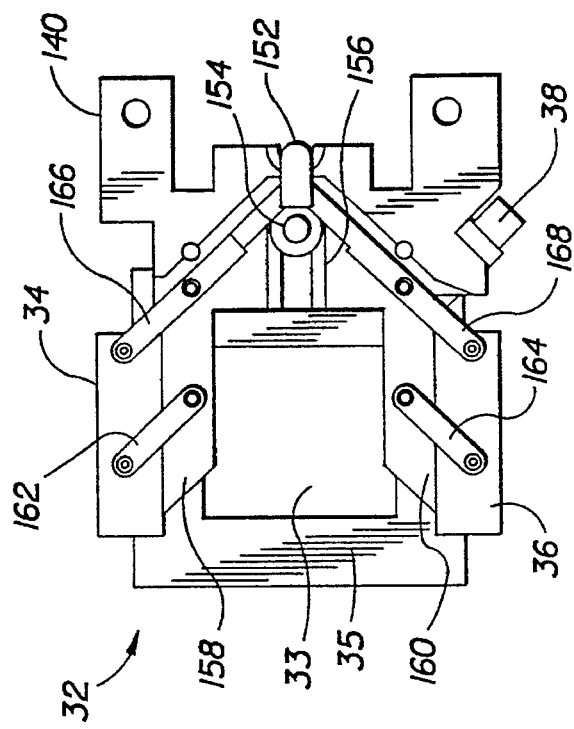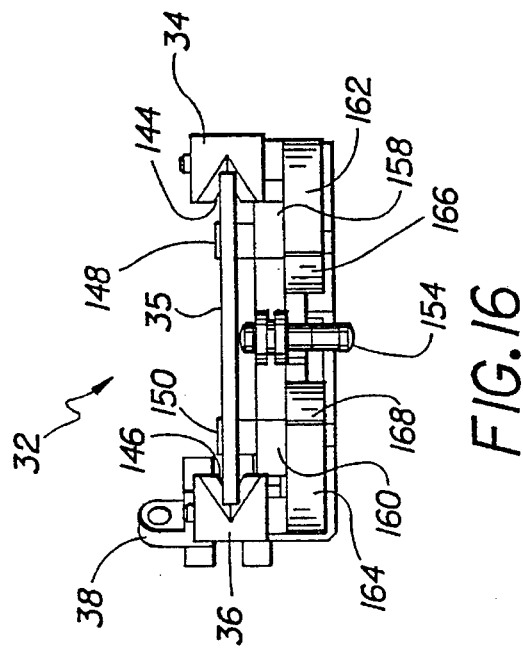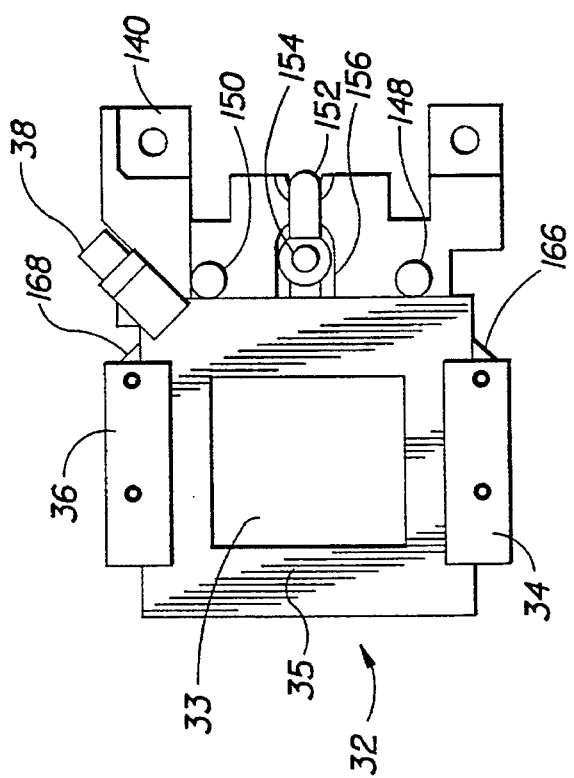

FILM SCANNER WITH IN-LINE DUAL SCANNING GATES

CROSS REFERENCE TO RELATED APPLICATION

Reference is made to U.S. patent application Ser. Nos.: 167,643 filed on Dec. 14, 1993, and entitled "Film Clamp For Flattening Image Frames in a Scanning Gate"; (197,777) filed Feb. 16, 1994 and entitled "Passive Film Take-up Chamber"; (197,775) filed Feb. 16, 1994 and entitled "Light Integrating Cavity for a Film Scanner"; (197,774) filed Feb. 16, 1994 and entitled "Film Latent Image Bar Code (LIBC) Reader"; and (197,778) filed Feb. 16, 1994 and entitled "Film Positioning Method and Apparatus".

FIELD OF THE INVENTION

The present invention relates to film scanners for digitizing film image frames, and particularly to such a scanner having dual, in-line negative filmstrip and slide scanning gates on a scanning gate frame movable to position the selected scanning gate in a scanning station.

BACKGROUND OF THE INVENTION

Conversion of analog images into digital data has become widespread for a variety of applications, including storing, manipulating, transmitting and displaying or printing copies of the images. For example, images captured in photographic media are converted to digital data and stored on compact discs for readout and display as a video image, as exemplified by the KODAK® Photo-CD system, or reproduced employing various types of color printers. In order to convert the photographic image into a set of digital line data, the film image frame is transported through a film scanning station past, and illuminated in each scan line with a linear light beam of uniform, diffuse illumination, typically produced by a light integrating cavity or integrator.

The light transmitted through the illuminated scan line of the image frame is focused by a lens system on a linear CCD array, image detector which typically produces three primary color light intensity signals for each image pixel that are digitized and stored. The digitized signal values for each scan line may be formatted to a standard for video recording and display and stored on compact disc or magnetic media. Such film scanners take a variety of forms, and the various common aspects of film image frame digitizing, particularly line illumination and linear CCD array-based digitizers, are described in greater detail in commonly assigned U.S. Pat. No. 5,155,596.

In order to perform line scanning of an image frame of photographic negative filmstrips, it is necessary to provide an accurate film transport mechanism to transport a filmstrip into a scanning gate and hold the image frame flat in alignment with a scanning aperture. In one scanner type, the linear CCD array and scanning light beam are stationary so that the light beam illuminates a line of the filmstrip image frame, and a line of digitized data is stored. The film scanning gate and clamped slide or filmstrip image frame is incrementally moved or translated line-by-line until the entire image frame is digitized. Then a new image frame is positioned and flattened for scanning and digitizing. Such a scanning and digitizing system for Photo-CD conversion is embodied in the KODAK® PIW Model 2400 Photo-CD scanner system marketed by the assignee of this application.

In this film scanner, the scanning plane is vertical and the stationary scanner components are oriented horizontally. An operator introduces the negative filmstrip from the left side into a slot leading to a film track and drive mechanism to position an image frame in a filmstrip scanning gate and the image frame is clamped. A belt driven roller assembly advances the film strip through the filmstrip scanning gate past the stationary scanner components in a first pass for scanning the clamped image frame at a low resolution sufficient to provide a video display of the image frame on a monitor for viewing by the operator.

The color balance of the scanned and digitized image pixel data is automatically adjusted to the color balance characteristics of the video display. The operator may further adjust the displayed color balance or tone and intensity of the color display while viewing the result of the adjustments until satisfied, whereupon the adjustment factors for that image frame are stored. The orientation of the image may also be stored with the digitized data so that the CD player can rotate the image data 90° for display as a video image at the same aspect that the image was captured by the photographer.

As each image frame is scanned in this first pass, the scanned image frames of the vertically oriented filmstrip are advanced into a stationary take-up chamber. The take-up chamber is provided within the scanner to temporarily hold the filmstrip and isolate it from other apparatus that it could catch on and to keep it clean.

After all image frames are scanned, the trailing end of the filmstrip is advanced in the reverse direction into the filmstrip scanning gate one frame at a time. The filmstrip image frame is clamped and a focus adjustment is made by a scanning lens auto-focus system. After auto-focus, a translation stage translates the image frame to the start scan position, and then translates each image frame through the scanning station. The image frame is scanned at high resolution for digitizing the image as a field of data associated to the data derived in the low resolution scan of the same image frame. As the next image frame is advanced into the scanning gate, the filmstrip is transported back out the same slot that it was slipped into for removal by the operator when scanning of all frames is completed. Thus, positioning of the next filmstrip to be scanned must await the complete ejection of the filmstrip being scanned.

The filmstrip scanning gate includes the filmstrip scanning aperture, a clamp for flattening the image frame, the filmstrip drive roller assembly and a sensor for deriving perforation signals for use in re-positioning the image frames for high resolution scanning. It is possible to scan positive color transparencies in mounts, i.e. slides, in the Model 2400 Photo-CD scanner employing common components of the same film scanner station. To do so, it is necessary for the operator to manually replace the filmstrip scanning gate and substitute a slide clamp and scanning gate, in its place on the translation stage. The slides are manually inserted into a clamp so that one side of the slide mount is fitted against a fixed aperture frame. Thus, the slide scanning plane varies with the thickness of the slide mount, requiring re-focus of the scanning lens to the image plane.

The scanning area is left open in this film scanner to allow frequent replacement of the scanning gates, and the scanning station is therefore open to the infiltration of dust particles. The exchange of the scanning gates is tedious and mechanical breakdowns are possible in attempting the exchange. Moreover, the scanning gates are subject to damage when they are carelessly handled or stored when not in use.

Finally, the process is slow and productivity in scanning slides is low.

A lower resolution scanning and digitizing system of either a negative filmstrip or a positive slide for direct display as a video image is generally disclosed in commonly assigned U.S. Pat. No. 4,858,003. The '003 patent describes a mechanism for introducing and ejecting individual slides from a slide receiver frame forming a slide scanning gate defining a nominal slide scanning plane for the slide film. The slides are held flat with one mount side against the frame surrounding the scanning aperture. The actual slide film position may therefore be spaced from the nominal slide scanning plane by a distance depending on the thickness of the slide mount.

Negative filmstrips are fitted into an elongated carrier similar to a slide mount. Individual image frames are introduced into and aligned with a separate filmstrip scanning plane spaced from the slide scanning plane.

The optical system is adjusted to the slide and filmstrip scanning planes when either slides and negative filmstrip carriers, respectively, are presented for scanning. Such a gross adjustment each time a slide or filmstrip is to be scanned is time consuming.

In a further Kodak® RFS 2035 scanner, an auto feed slide device made by MARON, INC. feeds slides from a spring-loaded, horizontal hopper into a slide track. The parade of vertically standing slides move horizontally along their edge and are pushed out of the hopper and through a hopper slot with a shuttle device. The shuttle cannot feed slides from the hopper to the slide gate unless all the slides in the hopper are the same thickness and can pass through the hopper slot. The hopper slot can be manually adjusted for various slide thicknesses, but does not automatically do so. The slides are pushed toward the CCD area array so that one side of the slide mount is forced against a frame.

Problems to be Solved by the Invention

It is desirable to improve the speed and operating efficiency of film scanners by obviating the need to manually replace the slide and negative filmstrip scanning gates and associated mechanism to alternately scan slides and negative filmstrips. To satisfy this desire, there is a need for a filmstrip and slide handling apparatus that accepts either in the respective scanning gate and automatically positions it in the scanning station, completes the scanning and ejects the slide or filmstrip.

There is also a need for such a film scanner having a negative filmstrip scanning gate that clamps the negative filmstrip image frame in a film scanning plane and slide scanning gate for automatically registering its image frame in the film scanning plane regardless of variations in the thickness and side dimensions of various slide mounts to decrease the need for focusing the imaging lens of the film scanner.

Furthermore, there is a need for a film scanner that accepts more than one negative filmstrip for scanning so that productivity may be increased.

SUMMARY OF THE INVENTION

Accordingly, it is one object of the present invention to provide a filmstrip and slide scanner which can scan either filmstrips or slides without the operator having to change the scanning gates.

It is a further object of the invention to provide such a film scanner having a relatively sealed housing with separate input and/or output slots for negative filmstrips and positive slides communicating with handling apparatus for automatically positioning each in respective filmstrip and slide scanning gates and translating the positioned slides or filmstrip image frames through the scanning station.

It is a further object of the invention to provide a negative film transport system that allows for pre-positioning the next negative filmstrip to be scanned in the filmstrip transport mechanism while scanning of the previously positioned filmstrip is continuing to speed filmstrip handling.

It is a still further object of the invention to provide a slide scanning gate that automatically centers the mounted image frame to the film scanning plane of the scanning station regardless of the thickness of the slide mount to decrease time spent in focusing the scanning lens assembly.

These and other objects of the invention are realized in a film scanner having a negative filmstrip scanning gate and a slide scanning gate that may be alternately positioned in the scanning station.

In a first aspect of the invention, the film scanner includes a film scanning station, a negative filmstrip scanning gate for positioning image frames of the filmstrip in the film scanning station, an insertion slot for receiving a negative filmstrip into a particle transfer roller assembly for pre-positioning the filmstrip for scanning while a previous filmstrip is being scanned, an ejection slot, and a diverter for diverting the scanned filmstrip out the ejection slot and allowing the advancement of the pre-positioned filmstrip into the filmstrip scanning gate.

In operation, the pre-positioned filmstrip is advanced in a forward direction through the diverter and filmstrip scanning gate, as the scanning station performs a low resolution pre-scanning of the image frames. Then the pre-scanned filmstrip is advanced in the reverse direction into the filmstrip scanning gate, clamped in place, and the filmstrip scanning gate is translated more slowly through the scanning station which performs a high resolution main-scanning of the image frames. After each image frame is main-scanned, the filmstrip is ejected an image frame distance at a time through the diverter and out the ejection slot.

Preferably, a scanning gate frame supports the filmstrip scanning gate and diverter and is translatable with respect to the particle transfer roller assembly and film scanning station on a carriage driven on a track by a carriage drive motor for translating the image frames in the filmstrip scanning gate with respect to the scanning station to effect high resolution line scanning thereof in the main-scan operation. In addition, a drive roller assembly is provided on the filmstrip scanning gate and operable on advancement of the filmstrip through the diverter during pre-scanning to continuously advance the filmstrip through the filmstrip scanning gate as the filmstrip image frames are pre-scanned. The drive roller assembly is intermittently operated to effect the reverse direction advancement of each image frame of the filmstrip to position it for the main-scan operation.

In a second aspect of the invention, the scanning gate frame further comprises a slide scanning gate mounted in-line with the filmstrip scanning gate on the scanning gate frame and normally positioned, during filmstrip scanning operations, adjacent to a slide input/output slot. The scanning gate frame is movable by the carriage drive motor to position and translate the scanning gate frame through the scanning station during pre-scan and main-scan operations.

In operation, the scanning gate frame is normally positioned adjacent to the slide input/output slot to receive a slide for scanning when filmstrip scanning is not being conducted. After a slide is inserted, the scanning gate frame is driven by the carriage drive motor to move in the forward direction to advance the slide scanning gate and slide to center it in the scanning station to check focus. After the auto-focus is completed, the slide scanning gate is translated in the reverse direction to the start of pre-scan position. The slide scanning gate is translated in the forward direction to conduct the pre-scan operation. At the end of pre-scan, the carriage and scanning gate frame are translated in the reverse direction, and the main-scan operation is conducted in reverse order from the pre-scan. The line scan data derived in the pre-scan and main-scan are correlated in the proper order in software. After main-scan is completed, the scanning gate frame is driven in the reverse direction to present the scanned slide at the slide input/output slot for removal by the operator.

In a further aspect of the invention, the slide gate for aligning the image frames of a slide in a film plane, preferably comprises a slide gate base, first and second slide mount engaging jaws shaped to receive opposite edges of the slide mount and center the slide film image frame with respect to said film plane irrespective of the width of the slide mount and align the slide film image frame to said film plane irrespective of the thickness of the slide mount, and first and second pivot links coupled between said base and said first and second jaws, respectively, for pivotally supporting said jaws apart and in alignment with said film plane.

Advantageous Effects of the Invention

The dual in-line slide and filmstrip scanning gate arrangement provided by the scanning gate frame translatable on the carriage to scan either slides or filmstrips avoids the tedious and error prone removal and replacement of the filmstrip and slide scanning gate and translation stages and increases productivity.

During filmstrip scanning, the separate input and output slots and the operation of the diverter allows pre-positioning of a filmstrip to be scanned while scanning is proceeding with an earlier inserted filmstrip. Again, productivity is increased as the operator may enter scanning data for filmstrips and insert them into the input slot without having to wait to clear the slot of the filmstrip being scanned The slide scanning gate is constructed to receive slides having slide mounts varying in width and thickness and to center the slide film image frame in the film scanning plane despite the variations in slide mounts widths and thicknesses in order to decrease the need to adjust focus of the scanning lens system. The filmstrip clamp and scanning gate is also constructed to align the filmstrip image frame into the film scanning plane to avoid unnecessary adjustment of focus. In this regard, the self-centering of the slide mounted image frame reduces time spent focusing on the image frame and avoids the frequency of make-overs.

BRIEF DESCRIPTION OF THE DRAWINGS

Other objects, advantages and features of the present invention will become apparent from the following specification when taken in conjunction with the accompanying drawings in which like elements are commonly enumerated and in which:

FIG. 14 is a top plan view of the slide scanning gate;

FIG. 15 is a bottom plan view of the slide scanning gate; and

FIG. 16 is a front elevation view of the slide scanning gate.

The schematic illustrations are not to scale.

DETAILED DESCRIPTION OF THE PREFERRED EMBODIMENT

The drawings depict the construction and operation of the preferred embodiment of the film scanner of the invention employing a single scanning station including a light integrator for providing the scanning line of light onto a film scanning plane. A negative filmstrip image frame or a positive slide film image frame are positioned horizontally in a respective scanning gate between the diffuse line of light. A lens system and a tri-color linear CCD array are positioned on the other side of the image frame. The lens system may be coupled to an auto-focus system of a known type to fine-tune the focus to account for film bowing. The linear CCD array is of the type having closely spaced but separate, red, green and blue color filtered, rows of CCD elements that are electronically scanned to provide the R, G and B color signal values for each image pixel in each line scan that are digitized and stored for further processing as described in the above-referenced '596 patent.

Figure 1:
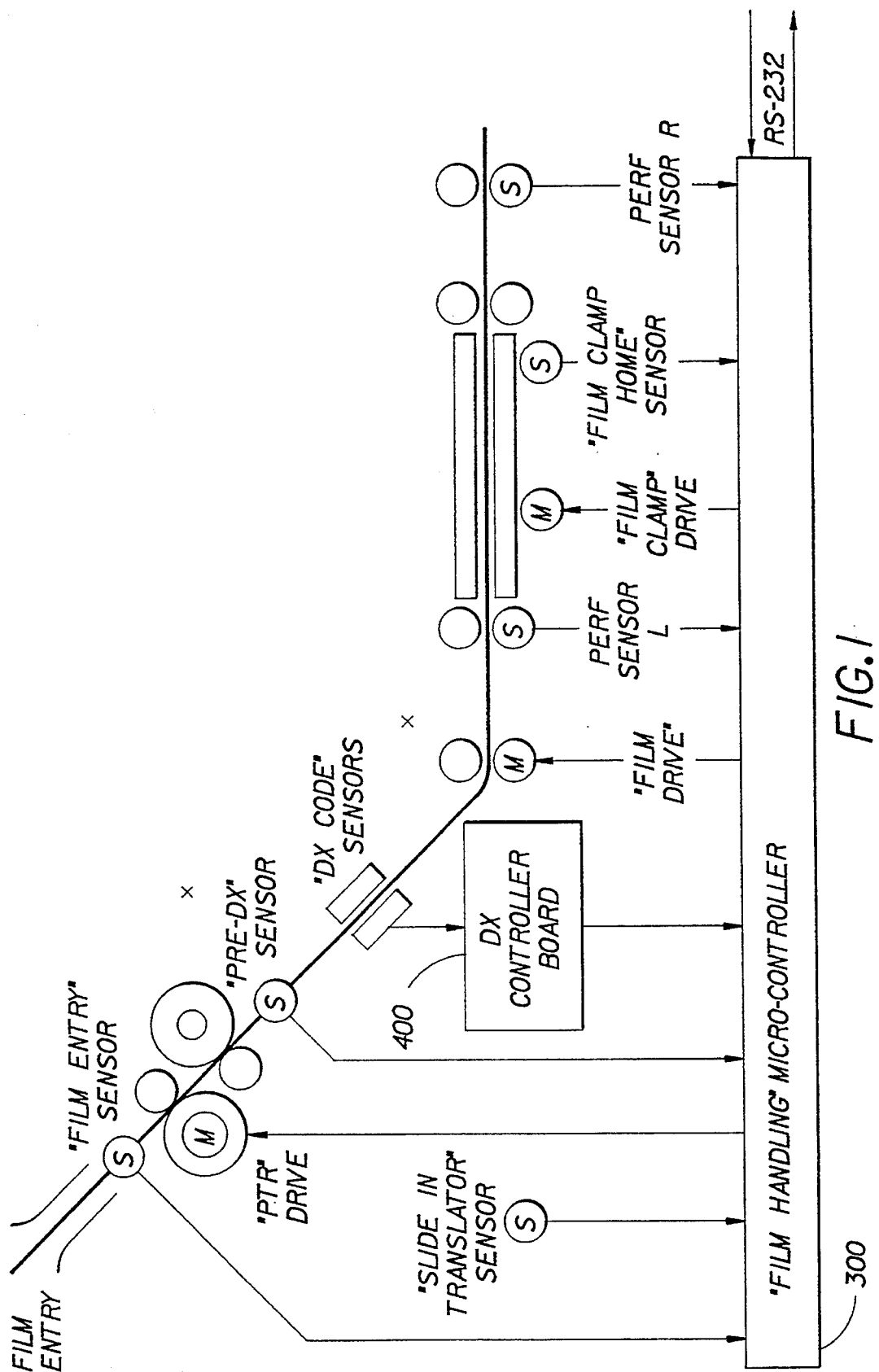
FIGS. 1 and 2 together are a system electro-mechanical block diagram of the inter-connection of a scanner computer with motors and sensors of the film scanner of the present invention.
Figure 2:
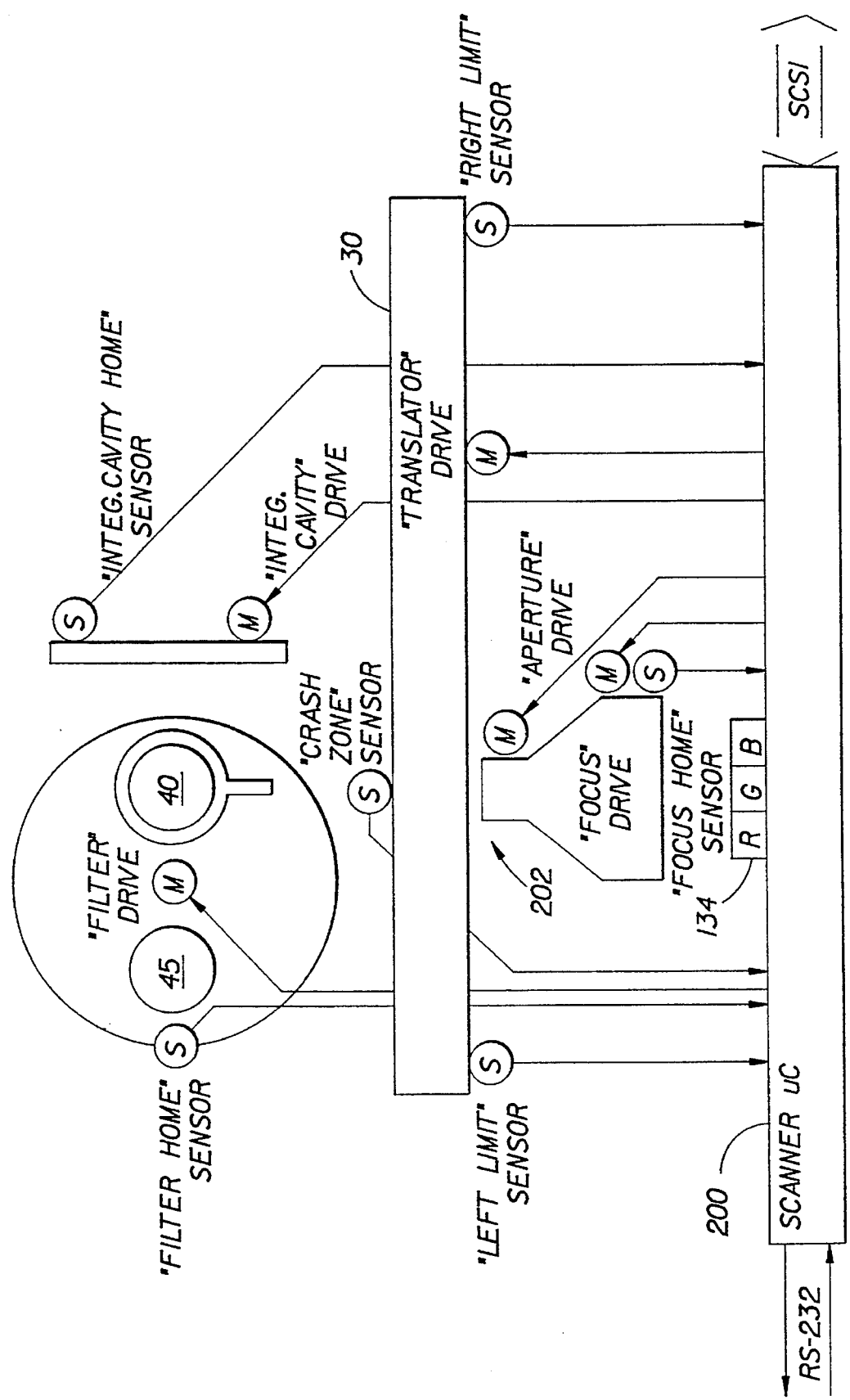

FIGS. 1 and 2 are a system electro-mechanical block diagram of the inter-connection of the scanner computer with motors and sensors of the film scanner of the present invention and an external computer and provide an overall view of their operations as described in greater detail in reference to the remaining figures. The external computer may be an IBM Corp. or Apple Computer, Inc. PC or a Sun Micro-Systems SPARC work station, having a keyboard and monitor. The external computer is loaded with operating software that provides instruction prompts to the operator and responds to operator commands to transmit instructions to the scanner computer and to process digitized image frame data for display on the monitor and printing through an SCSI interface with a film scanning micro-controller board 200 of the scanner computer. The scanner computer includes the film handling micro-controller 300 for controlling filmstrip handling operations, the film scanning micro-controller board 200 controlling various operations of the scanning station and carriage, and a further latent image bar code (LIBC) or "DX Controller Board" 400 handling operations of the "DX Code Sensors" or LIBC reader. The various motors ("M") and sensors ("S") controlled by and from which signals are derived, respectively, are labelled as shown in FIGS. 1 and 2 and are described hereafter to the extent that they play a role in the operations described.

The operator may enter information on the external computer keyboard related to a filmstrip order to be scanned, including the image frame numbers to be scanned, and the like. The operator also may enter a scanning command for scanning individual slides. The operator may view the results of the pre-scan as a video display image on the monitor and enter color balance, density, scene rotation and decide which images to main-scan or to eject the filmstrip.

The film handling micro-controller 300 shown in FIG. 1 includes a micro-processor operating under resident software which responds to sense and status signals from the various sensors S and provide motor control signals for the stepper drive motors M associated with the filmstrip handling apparatus. The film handling micro-controller responds to an output of the "Film Entry Sensor" indicating the leading end entry of a filmstrip by applying motor drive commands to the "PTR Drive" motor. The filmstrip is transported by the PTR roller assembly through a "Pre-DX" filmstrip end detector and the film handling micro-controller 300 enables the LIBC controller board 400 to read the bar code.

The LIBC controller board 400 receives commands from the film handling micro-controller 300 when a filmstrip is entering the LIBC reader assembly ("DX Code Sensors") to initiate LIBC reading. The LIBC readings are decoded by the LIBC controller board and provided as DX data to the film handling micro-controller 300. The decoded DX data is transferred to the film scanning micro-controller 200 on the RS-232 interface for transmission to the external computer.

The filmstrip is advanced into the filmstrip clamp and scanning gate, where left and right filmstrip drive roller assemblies are coupled to the "Film Drive" bi-directional stepper motor. The film handling micro-controller provides stepper drive pulses to advance the filmstrip in forward and reverse directions through or into and from the scanning station during pre-scanning and main-scanning operations. The film handling micro-controller 300 also receives left and right film position perforation ("Perf") pulse trains from the respective perf sensors. The filmstrip clamp and scanning gate also includes a "Film Clamp" drive motor energized to clamp the filmstrip image frames in the scanning station and receives a "Film Clamp Home" signal to ensure that the film clamp is released to advance the filmstrips through the filmstrip clamp and scanning gate.

FIG. 2 depicts the film scanning micro-controller 200 in relation to the components of the scanning station 202 and the carriage 30 for translating the slide or filmstrip scanning gates through a film scanning plane of the scanning station 202 as described hereafter. The components of the scanning station 202 include the light integrator assembly 40 and filter wheel 45 above the translator drive block, the lens system 132 and tri-color CCD linear array below the translator drive block, and the associated motors and sensors labelled in FIG. 2.

The film scanning micro-controller 200 includes a further micro-processor operating under resident software which responds to sense and status signals from various position and status sensors S and provides motor control signals for stepper drive motors M associated with the scanning station 202 and the carriage 30 described below.

In the translation operations, the film scanning micro-controller 200 operates the carriage 30 "Translator Drive" stepper motor and the light integrator ("Integ. Cavity") drive stepper motor in positioning the slide scanning gate (not shown in FIGS. 1 & 2) into and from the scanning station 202 and translating the slide scanning gate in both pre-scanning and main-scanning of slides. In this regard, the "Right Limit" and "Left Limit" sensors provide right and left limit signals of the carriage 30 position to the film scanning micro-controller 200. At the left limit, the carriage 30 positions the slide scanning gate for receiving a slide from or returning a slide to the operator. The "Crash Zone" sensor is mounted to the carriage 30 and detects the side of the light integrator 40 to stop translation of the carriage 30. The "Integ. Cavity Home" sensor provides a signal to the film scanning micro-controller 200 that the integrator light bar is moved out of the way to allow translation of the carriage 30 as described below.

In addition, the translator drive motor is operated to translate the carriage 30 during the main-scan of the negative filmstrip image frame clamped in the filmstrip scanning gate after the film handling micro-controller 300 has operated the filmstrip drive rollers and positioned the image frames for main-scanning.

The film scanning micro-controller 200 also controls the operation of the tri-color CCD array 134 and the scanner lamp located behind the light integrator 40 (the lamp is described in the above-referenced '(Docket 68,560) application in detail). The film scanning micro-controller times the image frame scanning lines in the pre-scan and main-scan operations and clocks out the synchronous three color line scan data from the tri-color CCD linear array during each line scan. The line scans are counted and the line scan numbers are provided to the film handling micro-controller 300 for use in controlling the filmstrip image frame positioning for main-scanning.

The scanning lens system includes an aperture setting and auto-focus system controlled by the film scanning micro-controller 200. The lens "Aperture" drive and "Focus" drive motors are operated to set the proper aperture and focus. The aperture drive motor is used to "stop down" the lens aperture to provide a greater depth of field for scanning slide film, which inherently bow somewhat in their mounts.

The auto focus operation is accomplished by scanning a stationary film image frame while operating the focus drive motor to adjust focus through the entire range of focus. The line scan image data is applied to the external computer where it is analyzed for optimum focus. The optimum focus position is provided to the scanning micro-controller for setting the focus for use in further scans of the same filmstrip. The "Focus Home" sensor provides a signal at power up when the focus drive motor has found its home position. This initializes the focus mechanism to a known position prior to conducting the auto-focus operation.

Information as to the scanning gate frame and integrator positions and the status of slide and filmstrip scanning is also provided from the film scanning micro-controller 400 to the film handling micro-controller 300 in order to prompt the next filmstrip drive operation during main-scanning operations.

The DX data as to film type, manufacturer and generation is applied to the external computer 200 and is used by resident software to color correct the line scan data to the color display characteristics of the monitor in a manner well known in the art to provide realistic color display of the image if it were to be printed.

Both the pre-scan and main-scan data are transferred via the SCSI interface to the external computer. The pre-scan data is analyzed by a frame line detection algorithm (FLDA) to determine the location of all the images on a film strip in terms of the pre-scan line number. The pre-scan image data is also applied to the monitor to display the low resolution image for the reasons described above.

The main-scan data is applied to the external computer to either be printed or written to a Photo CD. The system may include a color laser or thermal printer under the control of the external computer 200 for making prints of the scanned images in whatever size is desired. A Photo CD writer Model 200 may also be employed under the control of the external computer to create a Photo CD for viewing the image on television using a KODAK Photo CD player.

Figure 3:
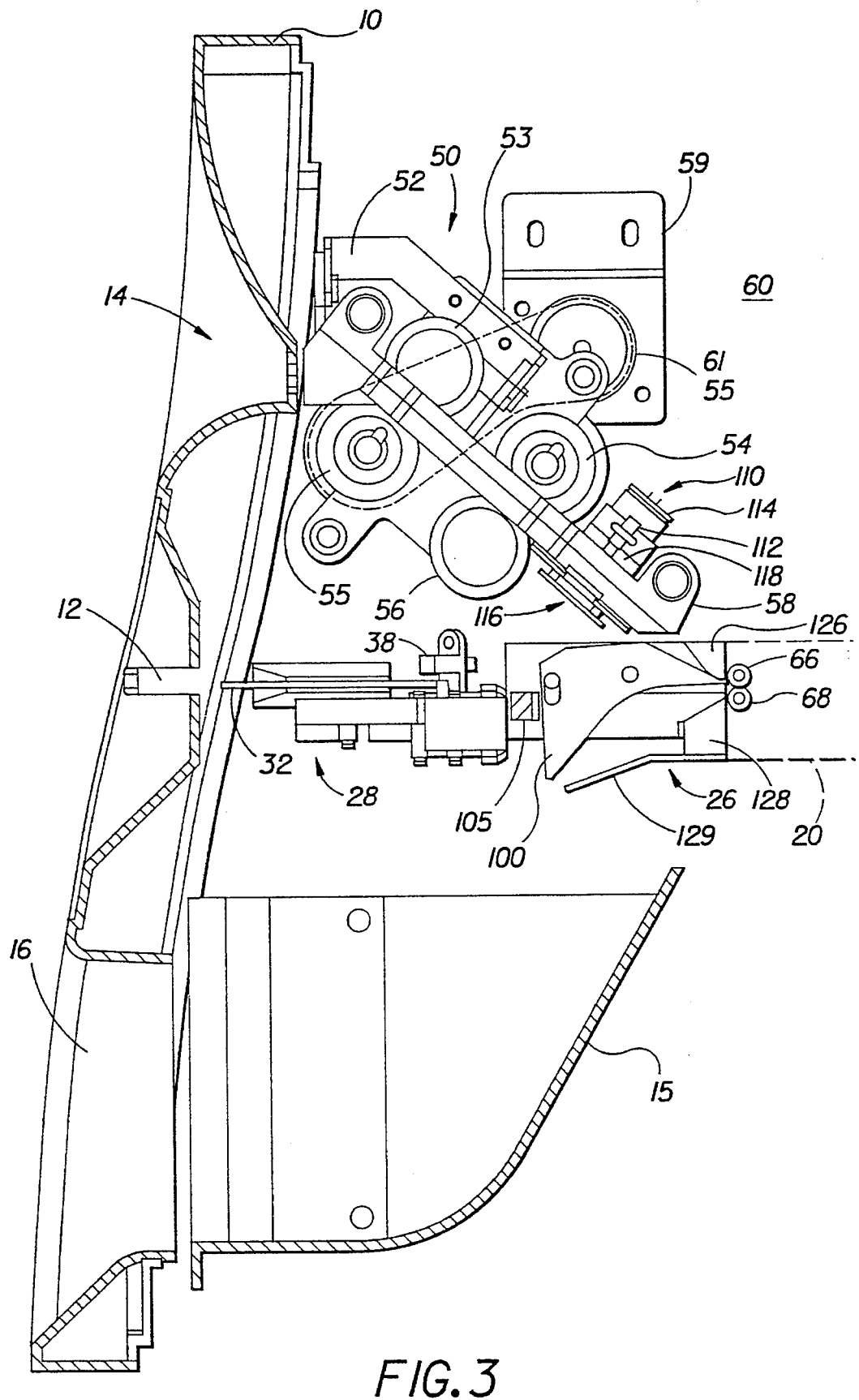
FIG. 3 is a side cross-section view of a portion of the exterior housing in relation to a portion of the slide and filmstrip transport apparatus of the film scanner of the present invention.
Figure 4:
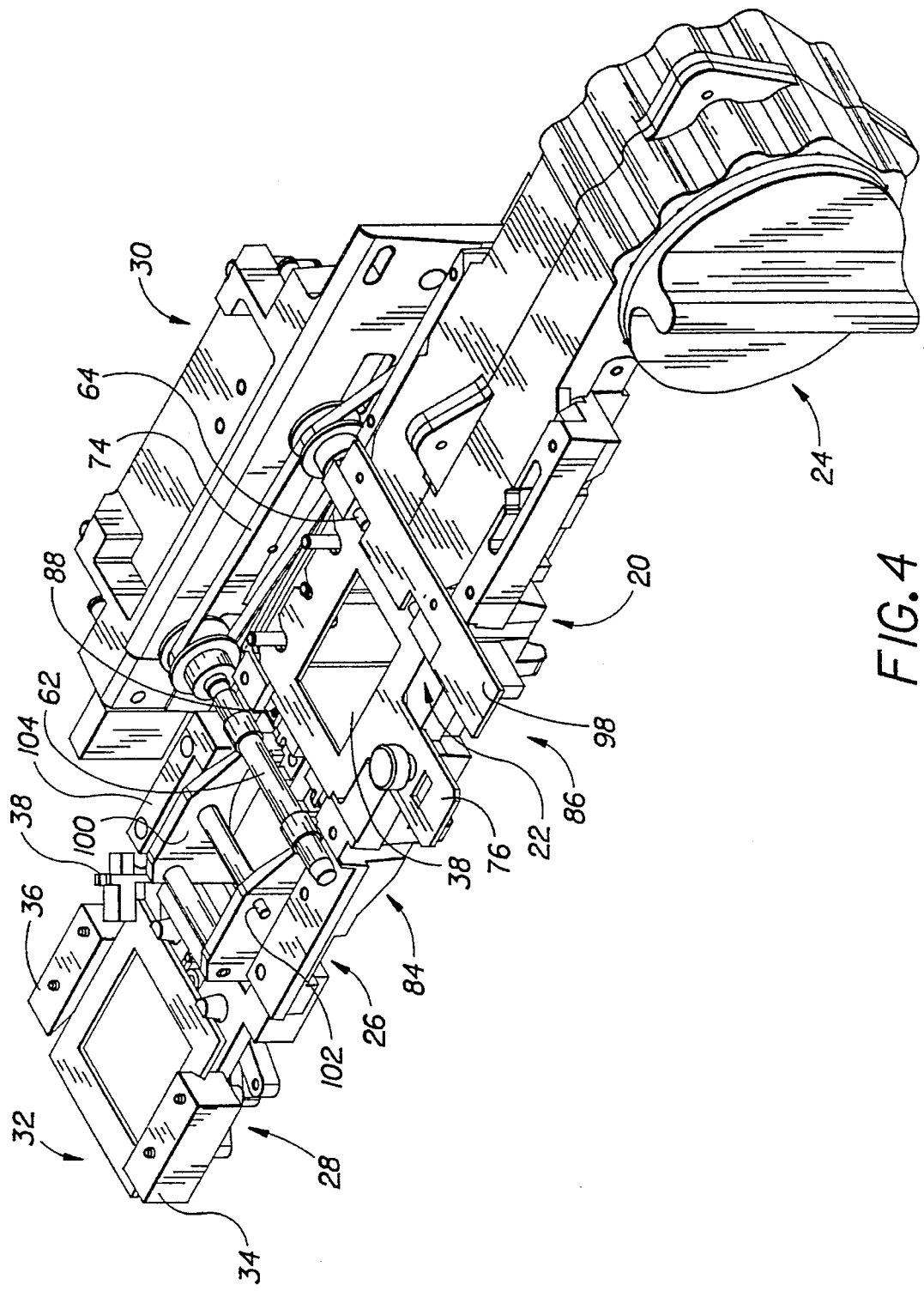
FIG. 4 is a perspective view of the scanning gate frame and carriage of the film scanner of the present invention.
Figure 5:
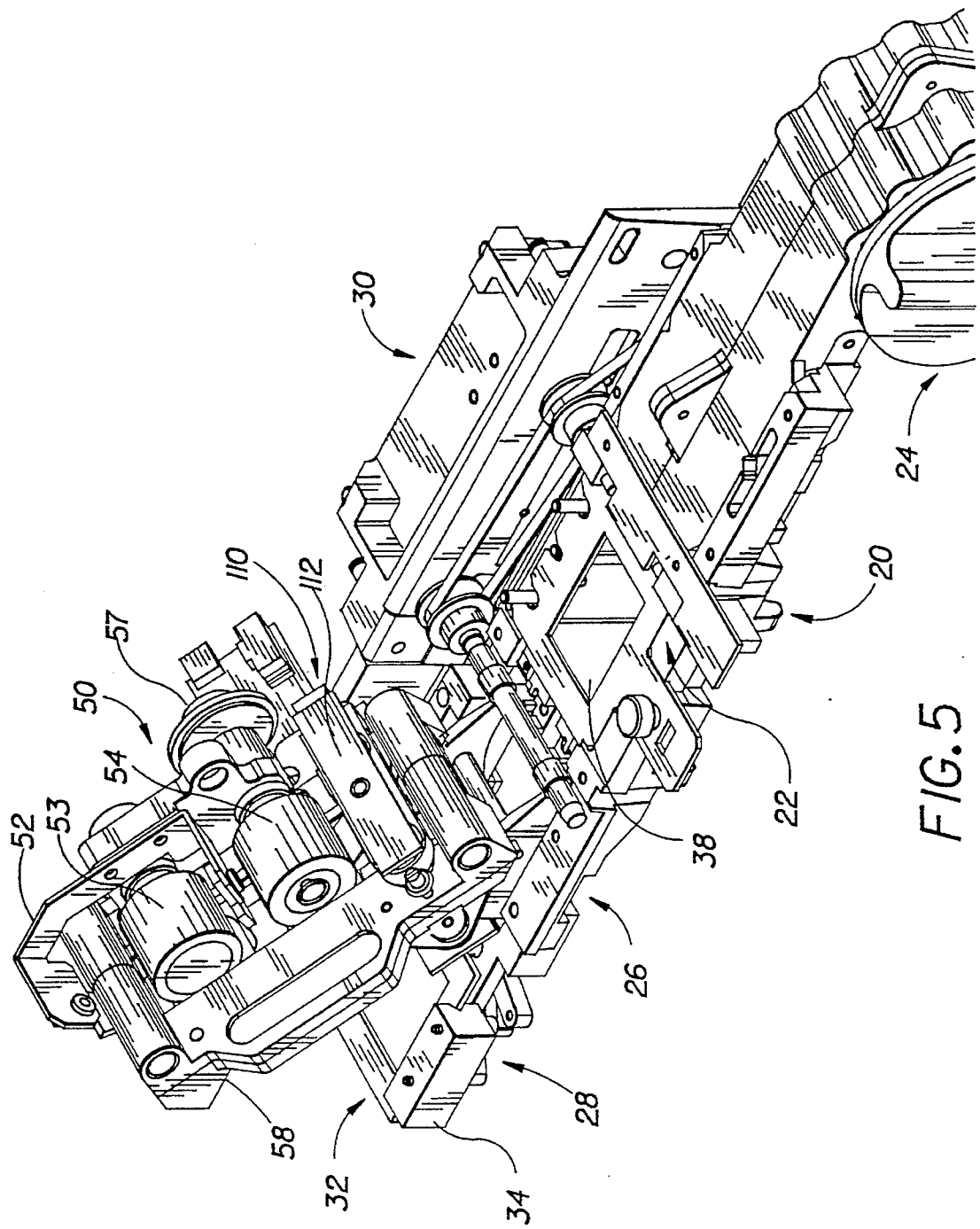
FIG. 5 is a perspective view of the scanning gate frame and carriage of FIGS. 4 in relation to a filmstrip particle transfer roller (PTR) assembly for receiving and transporting inserted filmstrips into the negative scanning gate.
Figure 6:
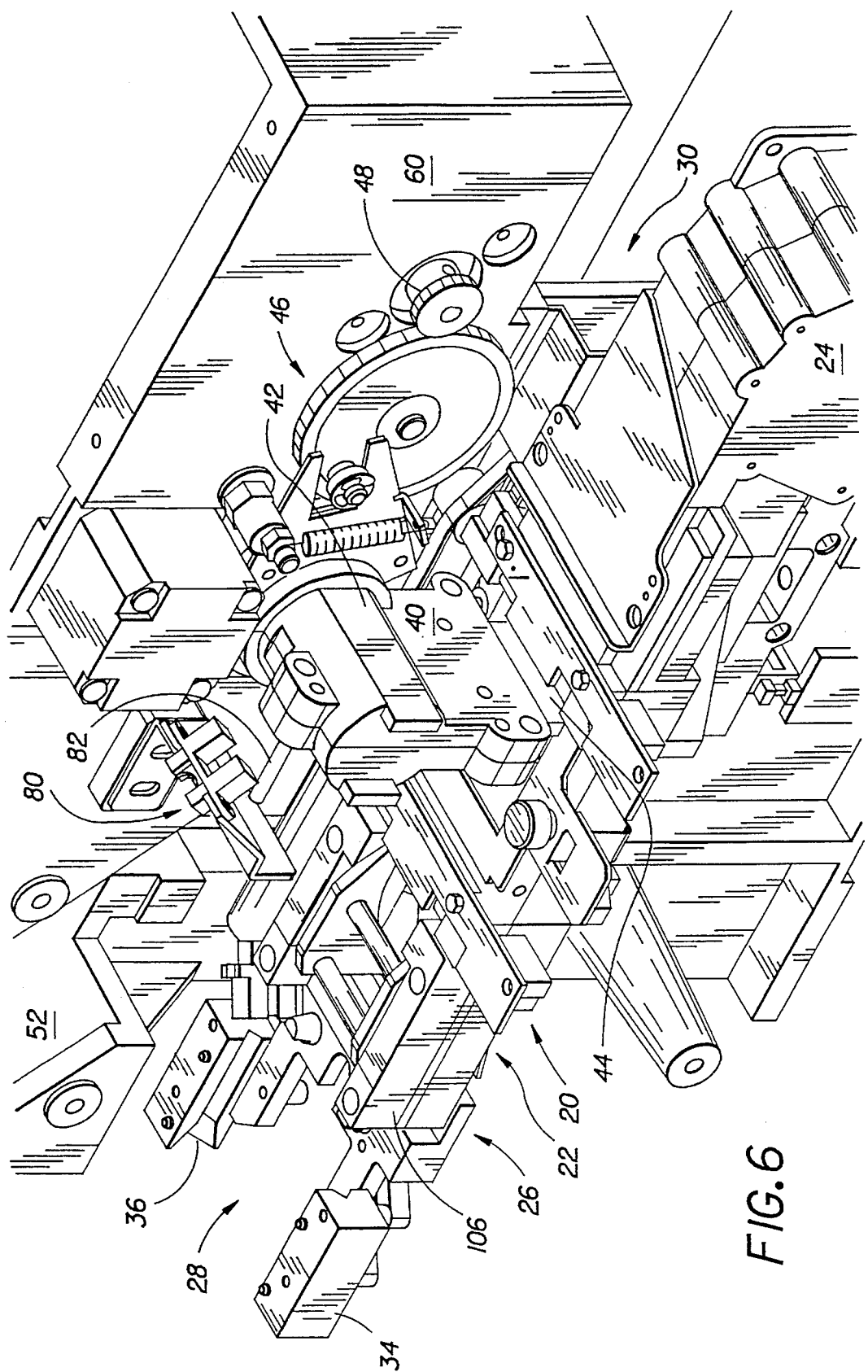
FIG. 6 is a perspective view of a light integrator arranged with respect to the scanning gate frame and carriage of FIG. 2 in the scanning position to scan negative image frames of a filmstrip in the filmstrip clamp and scanning gate.

Turning now to the construction of the film scanner as shown in FIGS. 3–6, the scanner housing 10 is depicted in a partial side view in FIG. 3 to show the slide input/output slot 12 and the separate filmstrip input slot 14 and output slot 16 in relation to certain of the filmstrip and slide handling components of the film scanner depicted more completely in the remaining FIGS. 4–6. The depicted components include the fixed PTR assembly 50 and LIBC reader assembly 110 for receiving, pre-positioning and advancing filmstrips, while reading LIBC information, to a filmstrip diverter 26 of the movable scanning gate frame 20 shown schematically. A slide scanning gate 28 is mounted at the left end of the scanning gate frame 20 and positioned in-line with the slide input/output slot 16.

When scanning filmstrips, a filmstrip inserted into input slot 14 is transported into the filmstrip scanning gate 22 mounted on the elongated scanning gate frame 20 to the right of the filmstrip diverter 26. During scanning, the display alerts the operator that the next filmstrip may be inserted into the input slot 14 to be pre-positioned in the PTR assembly 50 while scanning of the preceding filmstrip is continuing.

The diverter 26 includes the flipper 100, the stop 105, the upper film guides 128, and the lower film guide 128 including the extension plate 129. The flipper is pivotally mounted at flipper shaft 102 and weighted so that it rotates counterclockwise into the normal up position depicted, opening the gap between the flipper 100 and the lower film guide 128. As filmstrip image frames are main-scanned, the filmstrip is passed through this gap in diverter 26, fall onto the chute 15 and pass out the filmstrip exit slot 16. The flipper may be pivoted down by the force applied by the leading end of a filmstrip advanced from the PTR drive track and pass through the gap between the flipper and the upper film guide 126. The downward motion is limited by contact of the flipper against stop 105.

When scanning slides, the operator enters the slide scanning command and inserts a slide into the input/output slot 12 and into aligned jaws of the slide scanning gate 28. The presence of the inserted slide is detected and slide scanning is carried out as described below. The slide is then returned to the input/output slot 12, and the display indicates that the slide may be withdrawn. This process is repeated for scanning slides.

Turning now to FIGS. 4 through 6, they are perspective views of the scanning gate frame 20 and carriage 30 in relation to a rotatable light integrator assembly 40 and PTR assembly 50 mounted to an interior frame 60 of the film scanner of the present invention. The elongated scanning gate frame 20 defines part of a filmstrip transport path and is made up of the negative filmstrip clamp and scanning gate 22, as well as a filmstrip take-up chamber 24 to its right and the filmstrip diverter 26 and slide scanning gate 28 to its left. The elongated scanning gate frame 20 is in turn supported by the carriage 30 that may be translated to the right and left on frame 60 in relation to the PTR assembly 50 and light integrator assembly 40 from the position shown in FIGS. 4–6 under the control of the film scanning micro-controller 400 in a manner and for reasons described below.

Certain of the components of the filmstrip diverter 26 and the filmstrip clamp and scanning gate 22 shown in FIG. 6 are deleted in the views of FIGS. 4 and 5 for ease of viewing interior components. The slide 32 is depicted in the jaws 34 and 36 of the slide scanning gate 28 in FIGS. 4 and 5. Only the mounting bracket 52 for the PTR assembly 50 of FIGS. 3 and 5 is depicted in FIG. 6. In addition, first and second embodiments of the filmstrip take-up chamber 24 described in particularity in the above-referenced '(Docket 68,561) application are depicted in FIGS. 6 and in FIGS. 4 and 5, respectively.

In FIG. 4, the negative filmstrip clamp and scanning gate 22 is depicted in a perspective view in relation to the left and right filmstrip drive roller assemblies 62 and 64, on either side of the filmstrip scanning gate aperture 38. Each of the drive roller assemblies 62 and 64 include sets of upper and lower drive rollers (depicted as rollers 66, 68 and 70, 72 in the schematic views of FIGS. 7–11) that engage the filmstrip edges in the nips formed therebetween. The drive roller assemblies 62, 64 are coupled by a drive timing belt 74 to a reversible drive motor within the movable carriage 30 that operates on command of the film handling micro-controller 300 to advance the filmstrip in the forward and reverse directions with respect to the scanning aperture 38 during pre-scan and main-scan operations. The filmstrip is advanced in the forward direction into a cavity in take-up chamber 24 during the low resolution, pre-scan and digitization operation and then advanced out of the cavity in the reverse direction during the high resolution, main-scan operation.

Several other parts of the filmstrip clamp and scanning gate 22 are omitted in FIG. 4 or obscured from view. In particular, the components of the film clamp for flattening the image frame of the filmstrip in the scanning plane in aperture 38 during the main-scan are largely hidden below the removable aperture defining plate 76 and within the elongated scanning gate frame 20, The components of and operation of the preferred negative filmstrip clamp are not of importance to the present invention but are described in detail the above-referenced '643 application, incorporated herein by reference. Typical film clamps are also described in commonly assigned U.S. Pat. Nos. 5,111,241 and 5,055,874.

The film clamp and scanning gate 22 also supports the left and right sprocket hole perforation or perf sensor assemblies 84 and 86 on the left and right sides of the scanning gate aperture 36 (perf sensor assembly 84 is shown in part in FIG. 4 and completely in FIG. 6). Each sensor assembly 84, 86 includes a light emitting diode (LED) (LEDs 88, 90 in FIGS. 7–11, reversed in position) fitted in an aperture in the lower frame of the filmstrip clamp and scanning gate 22 (e.g. as shown at 88 in FIG. 3). Each LED 88, 90 is aimed upward to emit light through its respective opening in the frame at the path of travel of the perfs along the sides of the typical 35 mm filmstrip 20 advanced in the film track of the filmstrip clamp and scanning gate 22. On the upper side of the filmstrip, photo diodes (photo diodes 92, 94 in FIGS. 7–11, reversed in position) are positioned on printed circuit boards 96 (shown in FIG. 6), 98 coupled by flexible cable to the film handling micro-controller 300. The details of construction are not important to the present invention, but are disclosed in the above-referenced '(Docket 69,483) application, incorporated by reference herein.

The movement of the filmstrip perfs past the perf sensor assemblies 84, 86 by the drive roller assemblies 62, 64 generates first and second pulse trains outputted by the photo diodes 92, 94. The film handling micro-controller 300 operates under stored algorithms in response to the pulse trains and the stepper motor drive pulses operating the drive roller assemblies 84, 86, as well as line scan interrupt signals from the film scanning micro-controller 400, to control filmstrip positioning during the main-scan. In addition, normal and fault conditions in the filmstrip positioning are detected and distinguished to alert the operator to faults.

FIG. 4 also depicts the filmstrip diverter 26 attached between the slide scanning gate 28 and the filmstrip scanning gate 22. The flipper 100 is supported on either side on the shaft 102 extending into a bore of a side support member 104, 106 (shown in FIG. 6). The flipper 100 is counterbalanced to pivot on the shaft 102 between the normal ejection (flipper up) position and the filmstrip insertion (flipper down) position in a manner described above and hereafter with reference to FIGS. 7–11.

Finally, FIG. 4 also depicts the slide scanning gate 28 attached at the other end of the filmstrip diverter 26 with the slide 32 inserted into the jaws 34, 36. A slide presence sensor 38 is also mounted to the slide scanning gate 28 in relation to the jaw 36 to detect the presence of a slide inserted for scanning and provide a slide present signal to the film handling micro-controller. The components of the slide scanning gate 28 and the slide scanning operation are described below in reference to FIGS. 10–16.

The slide scanning gate 28, diverter 26, filmstrip scanning gate 22 and take-up chamber 24 are attached as parts of the elongated scanning gate frame 20 and attached to the carriage 30 depicted in FIG. 4. The scanning gate frame 20 is driven left or right on a track by a carriage drive stepper motor (not shown) in relation to the fixed film scanner wall or frame 60 (shown in FIG. 6) under the control of the film scanning micro-controller 400. Since the filmstrip take-up chamber 24 also moves during translation of the image frame being scanned, the filmstrip remains stationary between the filmstrip clamp and scanning gate 22 and the take-up chamber 24. Thus, filmstrip binding or movement of dust particles into the cavity thereof that could take place if the filmstrip were to move relative to the take-up chamber 24 is avoided.

The PTR assembly 50 depicted in side view in FIG. 3, including the LIBC bar code reader 110 and a filmstrip entry sensor and pre-LIBC filmstrip sensor (neither visible), is also depicted in perspective positional relation to the filmstrip diverter 26 in FIG. 5. The PTR assembly 50 is attached to the PTR assembly mounting bracket 52 and comprises PTR upper drive rollers 53, 54, and PTR lower drive rollers 55, 56 (schematically shown in FIGS. 7–11) supported for rotation on a PTR frame 58. A PTR drive motor 57 is mounted by a motor mount 59 to the film scanner frame 60 and rollers 54 and 55 are driven by PTR drive motor 57 through a drive belt 61.

The PTR rollers 53–56 are formed of a low durometer (23 Shore A) urethane to which dust and fiber particles on the filmstrip are transferred, thereby effecting a cleaning of the image frames prior to scanning. The rollers 53–56 do not tend to transfer particles onto the next filmstrip but are intended to be periodically cleaned.

The PTR frame 58 defines the right and left sides of the film transport track (obscured by the PTR rollers), and filmstrips are advanced between the left and right sides by rotation of the PTR rollers by the PTR drive motor 57. The PTR frame 58 also supports the LIBC reader assembly 110 which includes right and left side LIBC readers hidden beneath printed circuit board 112 for reading the developed LIBC on either or both side edges of the filmstrip as it is advanced through the film transport track. The operation of the LIBC readers is not dependent on the lateral position of the filmstrip in the film track, and the track is slightly wider than the nominal 35 mm filmstrip width to allow for variations in that width.

Each LIBC reader (also depicted in the side view of FIG. 3 and schematically in FIGS. 7–11) preferably comprises an LED 112 mounted on the printed circuit board 114 in relation to an aperture plate 118 and a side cut in each side wall of the PTR frame 58. The side cuts provide for the direction of full intensity light past the edge of the filmstrip regardless of the lateral position of the filmstrip.

Each LIBC reader also preferably comprises a linear CCD array (e.g. CCD array 116 depicted in FIG. 3 and schematically in FIGS. 7–11) positioned below the filmstrip track and extending laterally from a track side across the side cut therein and the film track toward the other CCD linear array. The CCD linear arrays are positioned in optical alignment with the light cast by the respective LED and the shadow cast by the filmstrip edge. The CCD elements of each linear array are also positioned so that an initial section of CCD elements are masked from the LED light. The second section of CCD elements are positioned with respect to the side cut. The remaining CCD elements extend across the film track. Read out circuitry of the LIBC reader controller 500 sequentially reads out the charge levels of the CCD elements to derive "black" and "white" level reference signals, a filmstrip edge detect signal, and the contents of the LIBC tracks repetitively as the filmstrip is advanced by the PTR assembly 50. Other details of the construction and operation of the PTR assembly 50 and the LIBC reader assembly 110 are described in the above-referenced '(Docket 68,341) application, incorporated herein by reference.

Turning to FIG. 6, it depicts a light integrator assembly 40 supported by stationary vertical frame 60 in relation to a lens system and tri-color, CCD linear array positioned below the film scanning plane 24 into which the filmstrip clamp and scanning gate 22 and the slide scanning gate 28 are selectively introduced. All of these components are located within the housing of the film scanner and are accessible through an access door in the housing. The relative positions are shown schematically in FIGS. 7–11 described below.

The light integrator assembly 40 is described in detail in the above-referenced '(Docket 68,560) application, incorporated herein by reference in its entirety. Light integrator assembly 40 includes a light integrator 42 having a sealed, cylindrical integrating cavity with a sealed input port for admitting filtered light from a high intensity source, all located behind the frame 60. An elongated, sealed light emitting bar 44 extends downward from the integrator 42 adjacent to and across the width of the aperture 38 to direct a line of light onto the film scanning plane. The light integrator 42 is pivotally attached to the support frame 60 to pivot about the sealed end port from the scanning position depicted in FIG. 6 into a standby position. In the standby position, the light bar 44 is pivoted away from the film scanning plane to be clear of interference with components of the elongated scanning gate frame 20. Then, the scanning gate frame 20 may be translated by stepper drive motor commands from the film scanning micro-controller 400 to the carriage drive stepper motor to position the slide scanning gate 28 in the scanning station during slide scanning.

FIG. 6 also depicts a pivoting assembly 46 for effecting the pivotal movement of the integrating cavity 42 and bar 44 between the standby and scanning positions. The pivoting assembly 46 is driven through a plate and gear arrangement coupled to the gear drive gear 48 of a stepper motor located behind frame 60 described in greater detail in the above-incorporated '(Docket 68,560) application.

In summary of that description, when movement of the light integrator 42 and conducting bar 44 to the standby position is commanded by the film scanning micro-controller 400 to translate the scanning gate frame 20, the gear drive stepper motor coupled to drive gear 48 is energized by stepper pulses from film scanning micro-controller 400 to rotate clockwise. Light integrator 42 and bar 44 pivots clockwise against the force of the spring from the scanning position shown in FIGS. 7–9 to the standby position shown schematically in FIG. 10. The number of stepper drive pulses delivered is counted by the film scanning micro-controller 400.

In order to provide control and feedback, an electro-optical position sensor 80 is provided as shown in FIG. 6 (and shown schematically in FIGS. 7–11) mounted to the frame 60. Normally the output signal of the sensor 80 is present when the dowel pin 82 extending from the upper tab area of the integrator 42 is in the scanning position depicted in FIG. 6. When the dowel pin 82 moves with rotation of the integrator assembly 40 to the standby position (shown schematically in FIG. 10), it interrupts the output signal of sensor 80. The drive pulses to the drive gear 48 stepper motor are halted, and the count of stepper drive pulses delivered is saved. The drive gear 48 stepper motor locks the drive gear 48 which in turn holds the light integrator assembly 40 in the standby position against the return force of the spring.

When the return to the scanning position is commanded, the drive gear 48 stepper motor is energized in the opposite direction for a number of stepper drive pulses equaling the saved count. The integrator assembly 40 is rotated counter-clockwise by that number of stepper drive pulses to the scanning position. Calibration of the operation can be accomplished by adjusting the position of sensor 80 and components of the pivoting assembly 46.

Figure 7:
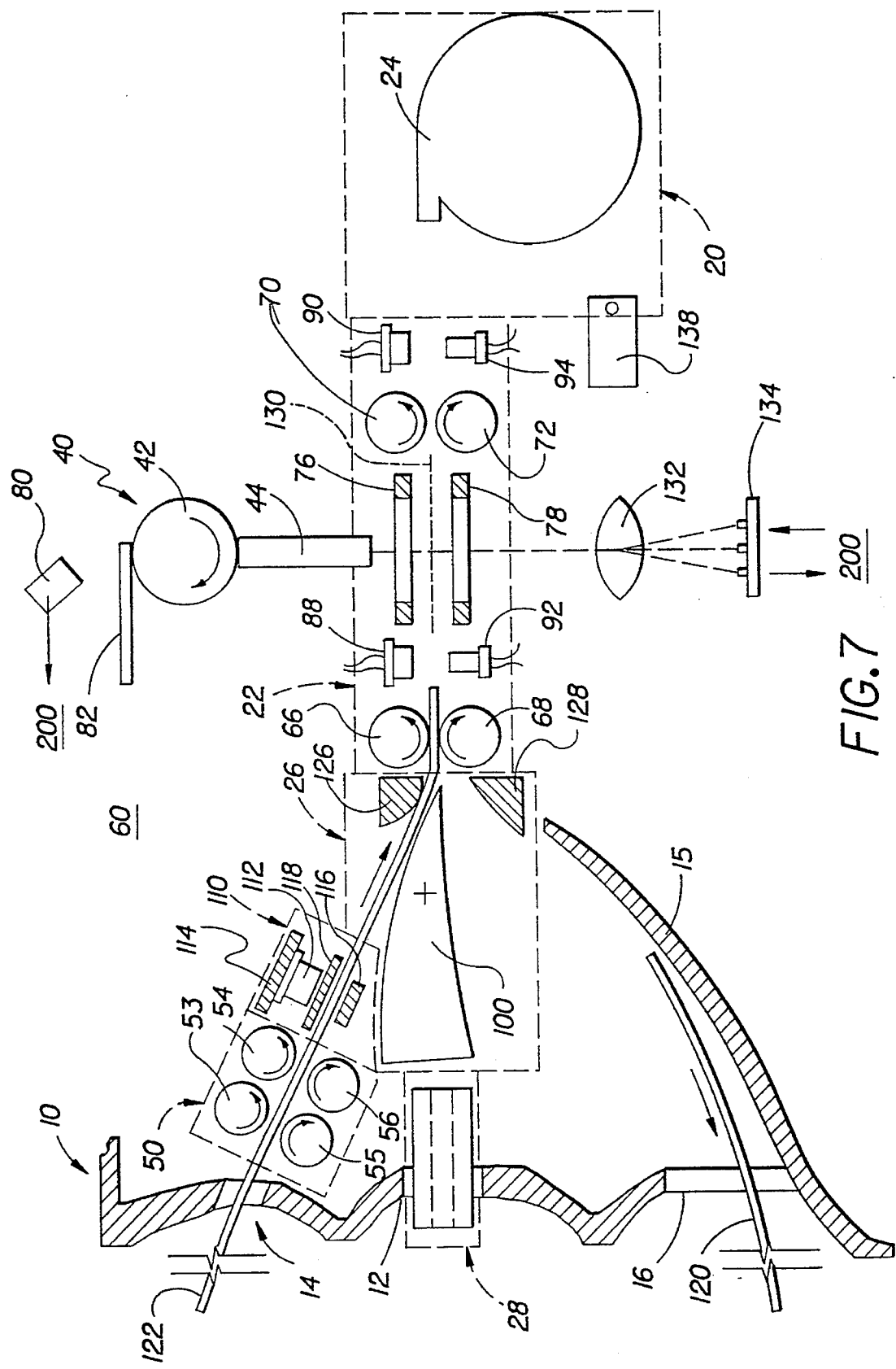
FIG. 7 is a schematic illustration of the components of FIGS. 1–6, particularly depicting the introduction of the next filmstrip into the filmstrip clamp and scanning gate as a previously introduced and scanned filmstrip is ejected.
Figure 8:
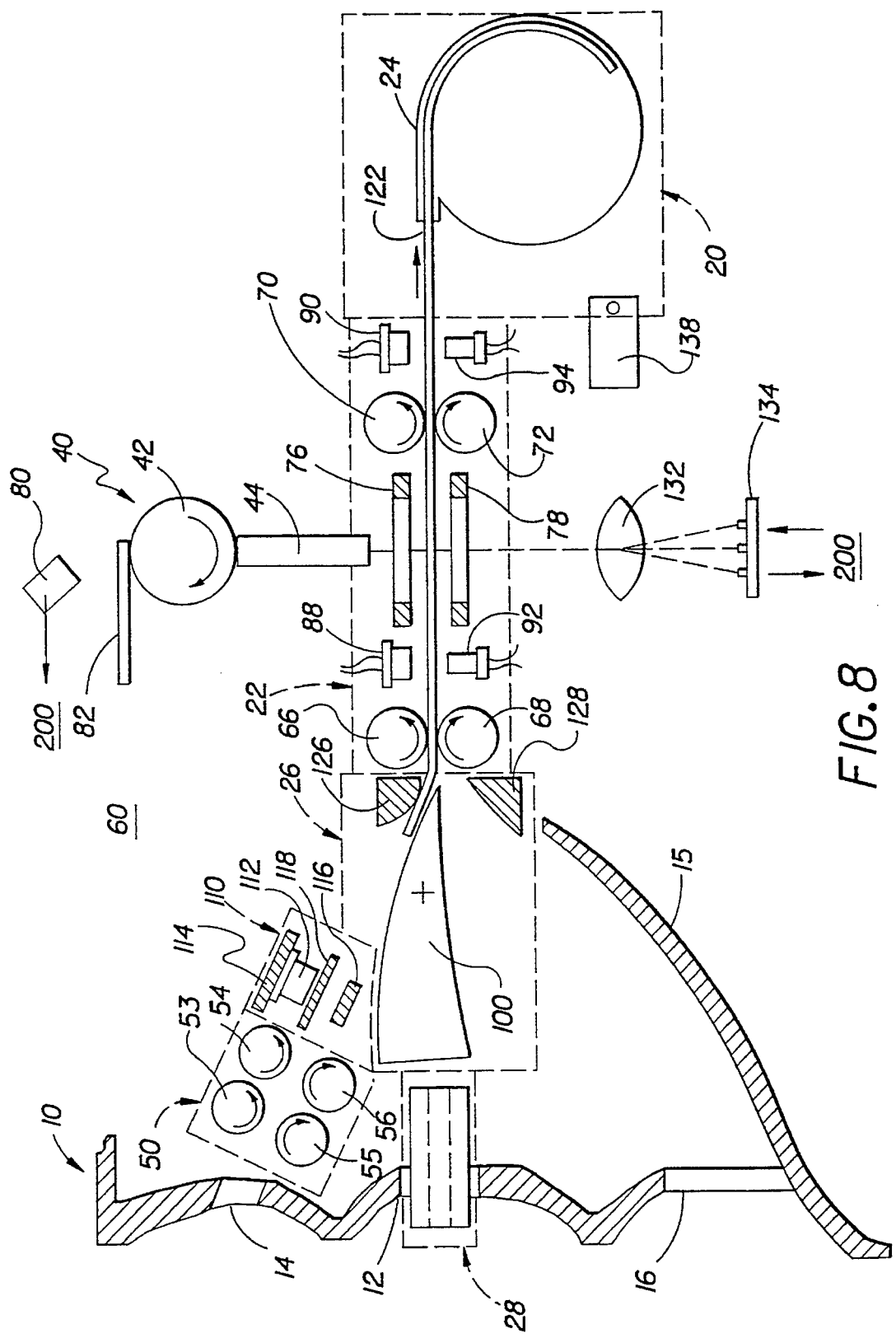
FIG. 8 is a schematic illustration of the continuous advancement of the filmstrip introduced in FIG. 7 into the take-up chamber as the image frames are pre-scanned in the scanning station and the sprocket hole "perfs" are detected.
Figure 9:
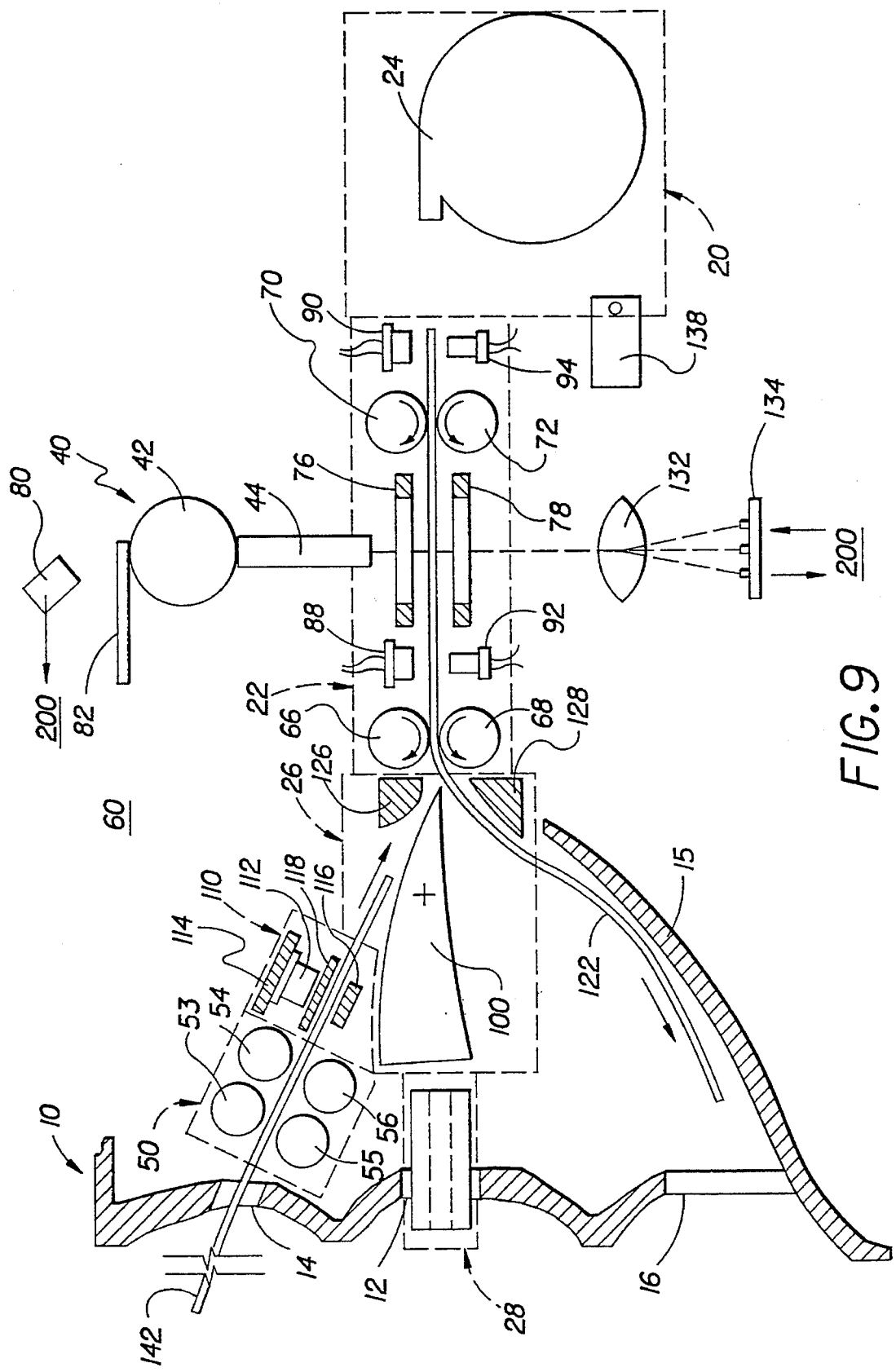
FIG. 9 is a schematic illustration of the withdrawal of the filmstrip advanced in FIG. 7 into the take-up chamber an image frame at a time to position the image frames for the main-scan and the ejection of the filmstrip toward the output slot.

Turning now to the filmstrip insertion, scanning and ejection sequence, attention is directed to the schematic illustrations of FIGS. 7–9 in conjunction with the structure of FIGS. 1–6. FIGS. 7–9 depict the film scanning plane 130 between the upper and lower clamp elements 76, 78, the scanning lens system 132, and the tri-color CCD linear array 134 that form the stationary film scanning station. The film scanning station includes the light integrator assembly 40 for providing a linear light beam onto a film scanning plane 130 through the light conducting bar 44, so that the light beam is modulated in color and intensity by the film image frame positioned in the film scanning plane 130 by the filmstrip or slide scanning gates. The CCD linear array 134 of light responsive CCD elements converts the modulated linear light beam into line scan electrical signals under the control of the film scanning micro-controller 400. The scanning lens system 132 focuses the modulated line of light onto the scanning array 134 as the film image is advanced through the image scanning plane 130 in the pre-scan and main-scan operations, employing the auto-focus system described above to make fine adjustments in focus, if necessary.

Each of the major components of the elongated scanning gate frame 20, i.e. the filmstrip clamp and scanning gate 22, the take-up chamber 24, the diverter 26 and the slide scanning gate 28, are depicted in respectively labelled blocks, and the frame 20 is in a filmstrip scanning position adjacent the left limit sensor 138. The light integrator housing 42 and light bar 44 are in the scanning position for scanning negative filmstrips in the image plane 130.

In FIG. 7, a previously scanned filmstrip 120 is depicted exiting down exit chute 15 and out the filmstrip exit slot 16 as the next filmstrip 122 to be scanned is being advanced by the PTR rollers 53–56 in the PTR assembly 50. Prior to that advancement, the trailing end of the previous filmstrip 120 was driven left by the drive roller assemblies 62 and 64 until its trailing end passed left of the left perf sensor assembly 84. The film handling micro-controller 300 responded to the last detected perf sense of the left perf sensor photo diode 92 and delivered a set number of stepper drive pulses to the stepper motor for the drive roller assemblies 62 and 64 to ensure that the filmstrip 120 was completely ejected.

The presence of the filmstrip 122 was detected earlier by a film entry sensor (not shown in FIGS. 7–11). In response, the film handling micro-controller 300 determined that the previous filmstrip 120 had exited the filmstrip scanning gate by detecting its trailing end and providing the set number of step pulses to the filmstrip drive motor assemblies operating in the reverse direction as described above. Then, the film handling micro-controller 300 began to provide stepper drive pulses to the PTR drive motor 57, as well as the stepper drive motor for the drive roller assemblies 62 and 64, in the forward direction and lowered (or confirmed the lowered position of) the film clamp members 78. The filmstrip 122 was advanced by the PTR drive rollers through a further sensor (not shown) which enables the LIBC reader controller 500 to commence LIBC reading.

As shown in FIG. 7, the filmstrip 122 has been advanced until its pre-scan leading end pushed flipper 100 down from its normal up position, entered the nip between the drive rollers 66 and 68, and approached the left perf sensor LED 88 and photo diode 92. When the first pre-scan leading end sprocket hole reaches the left perf sensor photo diode 92, the resulting perf signal is applied to the filmstrip handling micro-controller 300 which in response stops delivering stepper drive pulses to the PTR roller assembly 50 drive motor.

Turning to FIG. 8, left drive rollers 66, 68 and right drive rollers 70, 72 continue to be rotated counter-clockwise to advance the filmstrip 122 to the right, so that the leading end is directed into the cavity of the take-up chamber 24. The drive roller assemblies continuously advance the negative filmstrip 122 to the right during the pre-scan of the image frames at a relatively high speed, with the film clamp members 78 and plate 76 dis-engaged.

About the time when the perfs of the pre-scan leading end of the filmstrip 122 were sensed by the left perf sensor assembly, the film scanning micro-controller 400 was enabled to commence pre-scan operations by an instruction from the film handling micro-controller 300. During the continued advancement of the filmstrip 122 into the take-up chamber 24, the low resolution pre-scan data is collected for each image frame by the tri-color CCD linear array 134.

Returning to the pre-scan operation, pre-scanning of image frame data is accomplished at a line scanning rate of 583 lines per second set by the film scanning micro-controller 350. Each pre-scan line is given a line scan number that is provided to the film handling micro-controller 300. The film handling micro-controller 300 provides the filmstrip roller drive motor half-step pulses at a rate of 2102 per second. The half-step pulses are generated asynchronously with respect to the line scans. Thus, approximately 3.6 half-step pulses occur in the time that a single line scan occurs. In this fashion, the film is advanced 0.18 mm for each scan line.

During the pre-scan operation, the left and right perf sensor photo diodes 92 and 94 generate left and right perf pulse trains that are applied to the film handling micro-controller 300. In the pre-scan direction, the left pulse train leads the right pulse train by the number of filmstrip perfs that fall in the distance between the photo-diodes 92 and 94. Conversely, when the filmstrip is advanced in the reverse, main-scan direction, the right pulse train leads the left pulse train. The pulses of the first and second perf detection pulse trains recur at a lower frequency, given the 4.75 mm spacing between leading edges of adjacent sprocket holes, than the pre-scan lines or the half-step motor drive pulses. Each pulse has a high level or state when no film or a sprocket hole perf is present and is separated by a low level or state.

At the time that pre-scan operations start, the film handling micro-controller 300 commences an algorithm for storing positional data correlating drive roller assembly stepper pulses (referred to alternatively as half-step pulses) with the pre-scan line numbers and the left and right perf sensor pulse trains. The film handling micro-controller 300 stores the perf sensor states separately for each perf sensor at each drive motor half-step in a pre-scan_a_array and a pre-scan_b_array and also correlates the drive motor half-steps to pre-scan line numbers in a further array.

Both the pre-scan and main-scan data are transferred via the SCSI interface to the external computer. The pre-scan data is analyzed by a frame line detection algorithm (FLDA) to determine the location of all the images on a film strip in terms of the pre-scan line number. During main-scanning, coarse and fine re-positioning steps are taken to center each image frame in the scanning aperture of the filmstrip scanning gate employing the array data in conjunction with the image frame border line scan numbers. Further details of the generation and use of the positional data is set forth in detail in the above-referenced '(Docket 69,483) application incorporated herein by reference.

The pulse train generated by the left perf sensor photo diodes 92 is also employed to determine when the pre-scan trailing end of the filmstrip 122 is positioned between the drive rollers 70 and 72 and the drive roller stepper motor is to be halted. Step pulses provided by the film handling micro-controller to the drive roller stepper motor are ceased a set number of stepper drive motor pulses after cessation of the perf pulses of the left photo diode 92. It is desirable to halt filmstrip advance with the trailing end so positioned so that the filmstrip 122 is in position to be driven in the reverse direction by rollers 70 and 72 during the main-scan.

FIG. 9 depicts the motion of the filmstrip 122 in the reverse direction to position each image frame in the filmstrip clamp and scanning gate 22 for the main-scan. During pre-scan, the image frames were scanned from left to right as the image frames were advanced to the right through the film scanning plane 130. During main-scan, the direction of movement of the filmstrip 122 is reversed to the left, so that the pre-scan filmstrip trailing end becomes the main-scan filmstrip leading end. The flipper 100 of diverter 26 previously moved upward to the film eject position of FIG. 3 under its own weight so that the filmstrip 122 may be ejected in the reverse direction. The main-scanned filmstrip 122 is ejected, main-scan leading end first, downward into the chute 15 through the slot formed by the lower surface of flipper 100 and the facing surfaces of the lower film guide 128. Downward ejection of the main-scan leading end continues, and the filmstrip 122 is ejected through filmstrip output slot 16, an image frame at a time.

During main-scan, the filmstrip 122 is advanced a frame at a time into the filmstrip scanning aperture by reverse drive of the drive rollers 66–72 under control of the film handling micro-controller 300 employing the previously stored first and second perf number vs. pre-scan line number tables to position the image frame accurately. The drive roller motor is halted and the film clamp movable frame member 78 is engaged by energization of a film clamp drive motor (not shown) with a film clamp drive signal from the film handling micro-controller 300. The carriage drive motor (not shown) is energized by pulses from the film scanning micro-controller 400 to translate the filmstrip scanning gate 22 through the scanning station from left to right during the main-scan operation to derive the high resolution line scan image data.

Thus, during main-scanning, the drive rollers 66, 68 and 70, 72 are halted, and the carriage drive motor is operated by the film scanning micro-controller 400 to move the entire elongated scanning gate frame 20 through the scanning station by the image frame width. After each image frame is main-scanned, the carriage is translated to the left back to the start of main-scan position and the drive rollers 66–72 are energized to advance the filmstrip 122 in the reverse direction to position the next image frame into the filmstrip scanning gate to be main-scanned.

The auto-focus operation is accomplished with the first filmstrip image frame positioned for main-scanning. The clamped, image frame is line scanned while stationary and while operating the focus drive motor to adjust focus through the entire range of focus. The line scan image data is applied to the external computer where it is analyzed for optimum focus. The optimum focus position is provided to the scanning micro-controller for setting the focus for use in further scans of the same filmstrip.

At the same time that main-scanning commences, the operator is alerted that the next filmstrip image frame may be inserted in the filmstrip input slot 14. The next filmstrip 142 is inserted and staged by the PTR assembly 50, as shown in FIG. 9, to be advanced after the previously scanned filmstrip 122 is completely ejected as described above with respect to FIG. 7.

Figure 10:
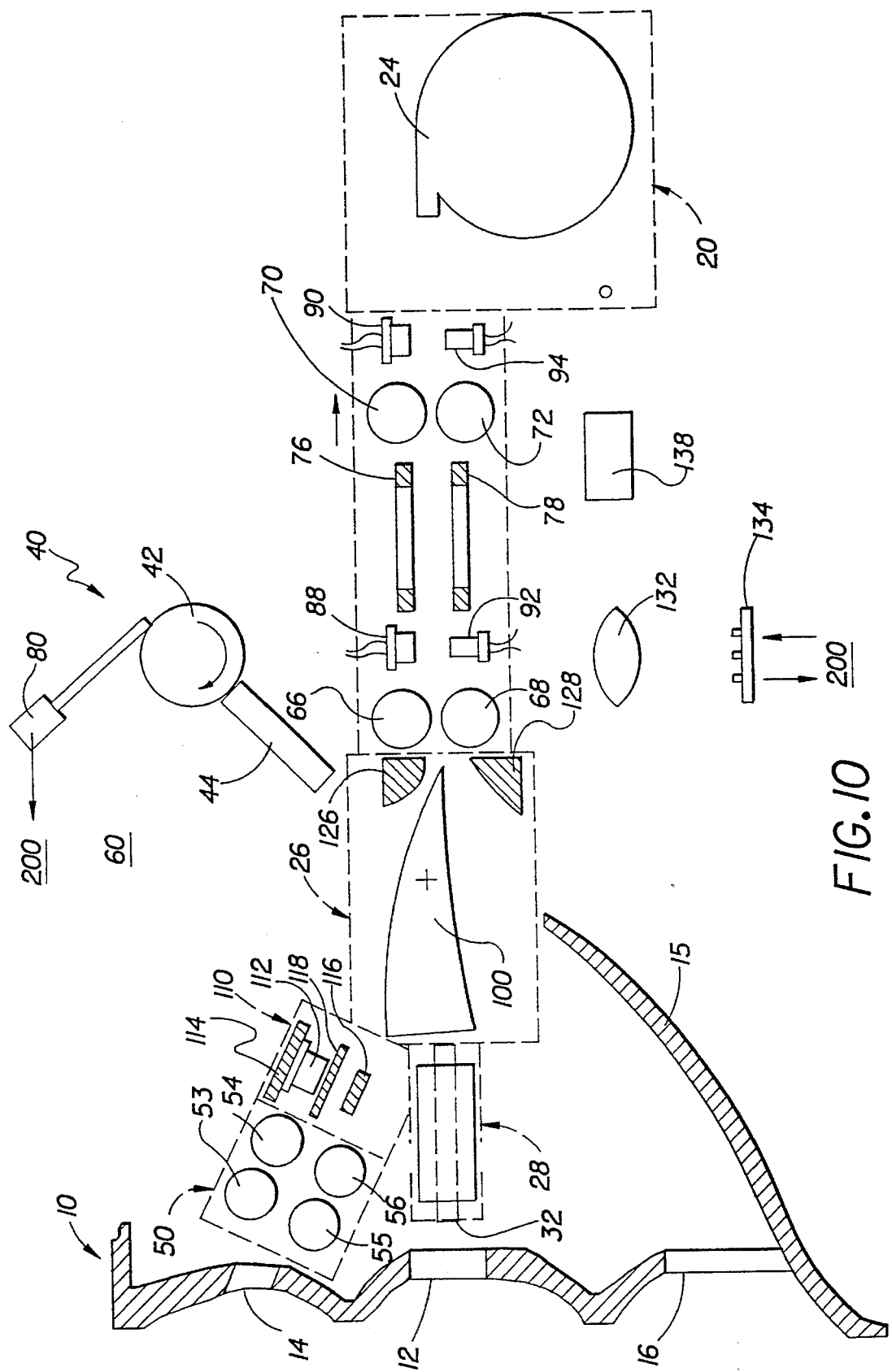
FIG. 10 is a schematic illustration of the rotation of the light integrator out of the way during the translation of the elongated scanning gate frame to the right to position the slide scanning gate in the scanning station and back to the left to re-position the scanned slide in the slide input/output slot.

At the end of filmstrip scanning, the jaws 34 and 36 of the slide scanning gate 28 are in alignment with the slide input/output slot 12 to receive a manually inserted slide. Slide scanning may be commenced, and the slide scanning gate 28 moved into the scanning station as depicted in FIGS. 10 and 11.

The slide scanning gate 28 is constructed to receive slides 32 having slide mounts 35 varying in width and thickness and to center the slide film image frame in the film scanning plane 130 despite the variations in slide mount widths and thicknesses in order to decrease the need to adjust focus of the scanning lens system 132.

When slide scanning is commanded and a slide 32 is loaded between jaws 34 and 36, the slide presence is sensed by the slide present sensor 38 and the sensed signal is provided to the film handling micro-controller 300. The light integrator housing 42 is rotated clockwise as shown in FIG. 10 so that light conducting bar 44 is pivoted out of interference with various components of the film clamp and scanning gate 22 and the diverter 28 as described above. After the position sensor 80 confirms rotation to the standby position, the scanning gate frame 20 is translated to the right to position the slide scanning gate 28 centrally in the scanning station by the film scanning micro-controller 400.

Figure 11:
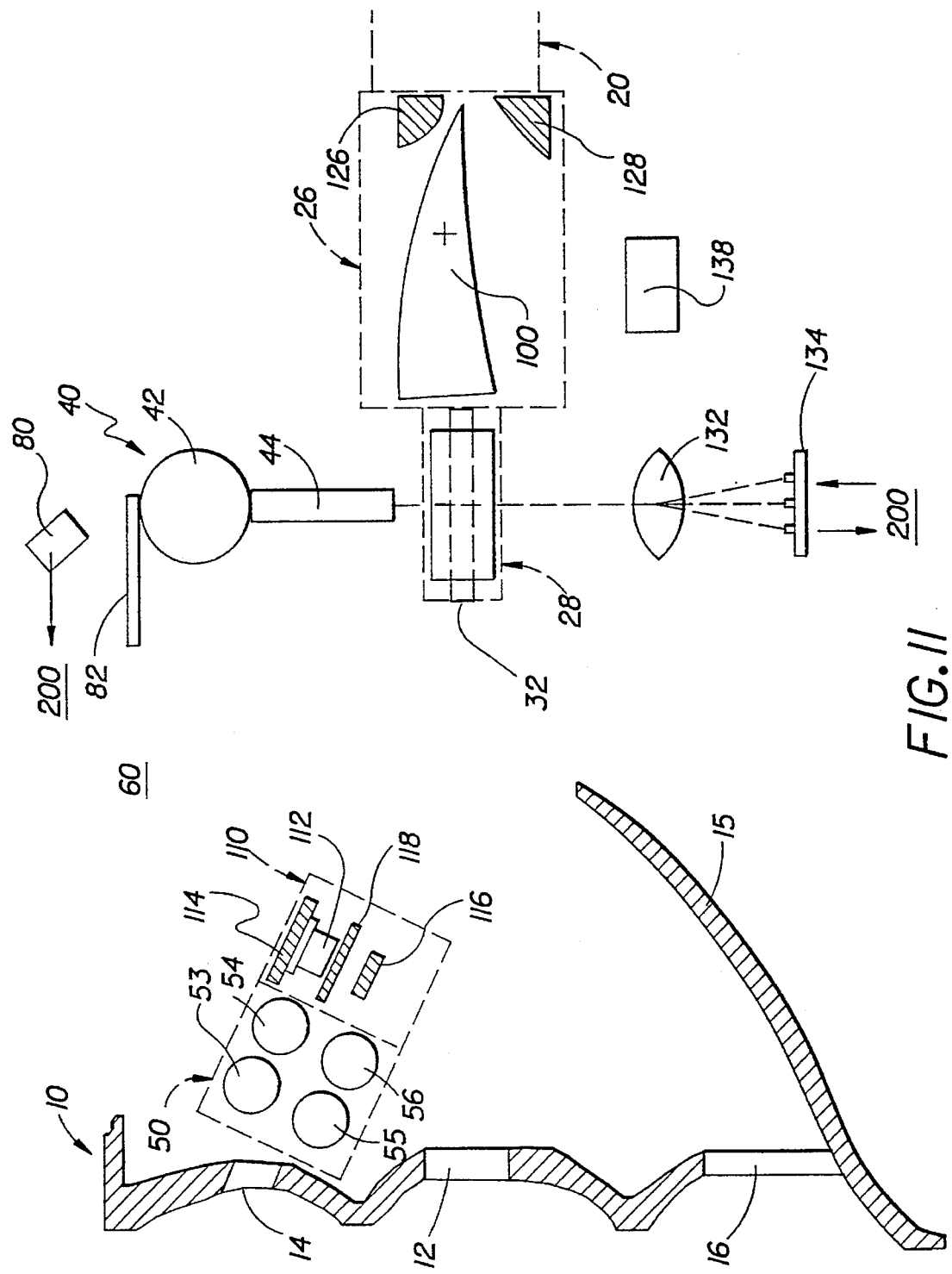
FIG. 11 is a schematic illustration of the slide scanning gate in the scanning position with the light integrator rotated back into the scanning position.

After the slide 32 and the slide scanning gate 28 is positioned in the scanning station, the integrator housing 42 and light conducting bar 44 is pivoted back to the scanning position of FIG. 11. A further crash zone position sensor (FIG. 2) is closed while the scanning gate frame is translated beyond the limits of image frame scanning in the position of FIG. 10. Its signal is employed to prevent the film scanning micro-controller from providing drive pulses to the light integrator stepper motor until the slide scanning gate is in the position of FIG. 11. When the slide scanning gate 28 is in the scanning station, the signal is no longer present and the film scanning micro-controller rotates the integrator housing 42 and light conducting bar 44 back to the scanning position.

Initially, the slide scanning gate 28 is centered in the scanning station so that the film scanning micro-controller can initiate aperture and focus setting of the scanning lens assembly 132. Then, during both the pre-scan and mainscan, the scanning gate frame 20 and carriage 30 are translated through the scanning station the width of an image frame to derive the low and high resolution scan data.

In this regard, the scanning gate frame 20 is driven by the carriage stepper drive motor to translate in the forward direction (i.e. to the right) to advance the slide scanning gate 28 and slide 32 through the scanning station to perform the pre-scan thereof. Upon completion of pre-scan, the carriage 30 and scanning gate frame 20 is driven in the reverse direction to re-position the right side of the slide scanning gate 28 in line with the light conducting bar 44. Then the scanning gate frame is translated again in the forward direction past the light conducting bar to perform the mainscan of the slid image frame. After main-scan is completed, the scanning gate frame 20 is translated in the reverse direction to present the scanned slide at the slide input/output slot 12 for removal by the operator after scanning is completed.

After scanning and digitizing is completed, the film scanning micro-controller 400 provides the drive motor step pulses to the gear drive 48 stepper motor to pivot the light integrator from the slide scanning position of FIG. 10 into the standby position of FIG. 9. Then, the film scanning micro-controller 400 provides drive pulses to the carriage drive motor to reposition the carriage 30 and scanning gate frame 20 back to the left position, so that the operator can manually withdraw the scanned slide 32 from the jaws of the slide scanning gate 28. The process is repeated if another slide is inserted into the slide scanning gate.

Slide mounts are of various thicknesses and vary in outer dimensions sufficiently that errors may occur in the scanning beam focus and in side to side centering of the film image frame in the slide scanning gate. These errors may or may not show up in the video pre-scan display for the operator to correct. Time may be lost in re-focusing and re-scanning such slides. In order to avoid losing time in re-focusing the lens assembly 132 and re-centering the slide frame, the slide gate 28 is configured to automatically center such slides in both the thickness and width dimensions. FIGS. 12–16 depict those improvements in detail.

Figure 13:
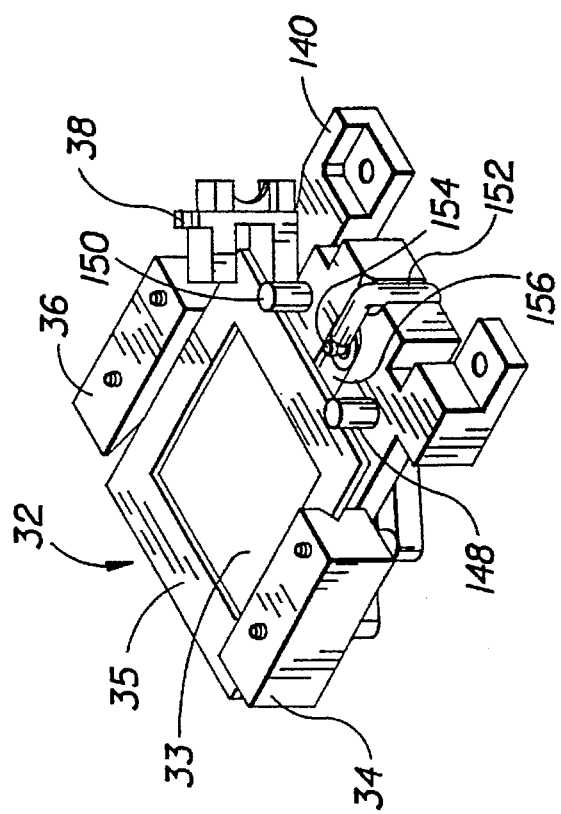
FIG. 13 is a rear top perspective view of the slide scanning gate.
Figure 12:
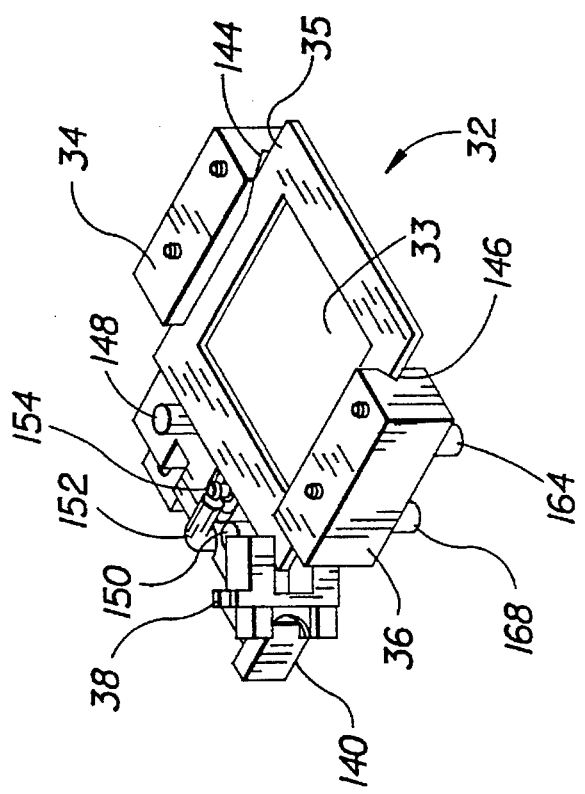
FIG. 12 is a frontal top perspective view of the slide scanning gate.

FIGS. 12 and 13 show the slide scanning gate 28 with a slide 32 in position in front and rear perspective views. The slide 32 has a central film image frame 33 that is sandwiched at its periphery between two mount halves that are adhered or snapped together to form the outer mount 35. The mount halves may be formed of plastic or cardboard, and the various materials have different thicknesses and outer dimensions.

The slide scanning gate 32 has specific centering features to accommodate and center such differing dimension slide mounts and to align the film image frame with the film scanning plane 130. The jaws 34 and 36 are formed with V-shaped notches 144 and 146, respectively that receive and the slide mount 35 as shown in FIGS. 12 and 16. The jaws 34 and 36 are mounted above the base 140 that is attached to the diverter 26 to swing outward equally against a spring force when the slide 32 is slipped into the V-shaped notches 144 and 146. The spring force forces the self-centering of the thickness and the width of the slide mount in the V-shaped notches 144 and 146.

As shown in the top views of FIGS. 12–14, the slide mount 35 is abutted against stop pins 148 and 150 when fully inserted. A corner of the slide mount 35 interferes with the light beam of the electro-optical sensor 38 which provides the slide present signal to the film handling microcontroller 300 as shown in FIG. 1 to initiate slide scanning operations described above.

The slide jaws 34 and 36 move apart against the force of an extension spring 152 extending around the base 140 from its upper to its lower surface that is attached to a pin 154 that is movable in a slot 156 in base 150. As shown in the bottom view of FIG. 15, the base 140 is U-shaped and has a pair of arms 158, 160 aligned in parallel with the jaws 34, 36. Forward pivot links 162 and 164 are mounted on pivots extending through the jaws 34 and 36, respectively, and arms 158, 160, respectively. Similarly, rear pivot links 166 and 168 are mounted on pivots extending through the jaws 34 and 36, respectively, and arms 158,160, respectively. The ends of rear pivot links 166 and 168 also extend rearward and centrally to the spring 152.

The pivot links 162–168 cooperate with the spring 152 and pin 154 to draw the jaws 34 and 36 inward to a position less than the minimum width of 35 mm slide mounts 35. As the slide mounts 35 are inserted into the V-shaped notches 146, 148, the jaws 34, 36 are spread apart and the pin 154 is advanced forward in the slot 156 by the ends of the pivot links 166, 168. The spring 152 is stretched and the V-shaped notches 144 and 146 of jaws 34 and 36 firmly grip and self-center the mount 35 in both the thickness and the width dimensions.

The various aspects of the inventions described and depicted are interrelated in the film scanning system for scanning both filmstrips and slides. However, the various aspects may be used apart from one another in sub-combinations as may be appropriate.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–16 scanner housing 10
slide input/output slot 12
filmstrip input slot 14
exit chute 15
filmstrip output slot 16
elongated scanning gate frame 20
negative filmstrip clamp and scanning gate 22
filmstrip take-up chamber 24
filmstrip diverter 26
slide scanning gate 28
carriage 30
slide 32
film image frame 33
jaws 34 and 36
slide mount 35
filmstrip scanning aperture 36
slide presence sensor 38
light integrator assembly 40
integrator housing 42
light conducting bar 44
filter wheel 45
pivoting assembly 46
stepping motor gear drive 48
particle transfer roller (PTR) assembly 50
PTR assembly mounting bracket 52
PTR upper drive rollers 53, 54
PTR lower drive rollers 55, 56
PTR drive roller motor 57
PTR frame 58
motor mount 59
interior frame 60
drive belt 61
left filmstrip drive roller assembly 62
right filmstrip drive roller assembly 64
rollers 66, 68 and 70, 72
drive belt 74
removable, upper aperture defining plate 76
movable lower aperture defining frame members 78
position sensor 80
dowel pin 82
left and right perf sensor assemblies 84 and 86
LEDs 88 and 90
photo diodes 92 and 94
printed circuit boards 96 and 98
flipper 100
flipper shaft 102
supports 104, 106
LIBC reader assembly 110
LED 112
printed circuit board 114
linear CCD array 116
aperture plate 118
preceding filmstrip 120
next filmstrip 122
upper film guide 126
lower film guide 128
upper film guide extension 129
film scanning plane 130
scanning lens system 132
tri-color CCD linear array 134
left limit sensor 138
base 140
next filmstrip 142
V-shaped notches 144 and 146
stop pins 148 and 150
spring 152
pin 154
slot 156
arms 158, 160
forward pivot links 162 and 164
rear pivot links 166 and 168

I claim:

1. A method of operating a film scanner for transporting elongated filmstrips through a filmstrip scanning station and positioning the elongated filmstrip image frames in a film scanning plane of said scanning station for a pre-scan operation and a main-scan operation comprising the steps of:

(a) inserting a filmstrip into a pre-positioning station to be positioned for advancement into said filmstrip scanning station upon exiting of a previously scanned filmstrip from said filmstrip scanning station;

(b) determining that any previously scanned filmstrip has exited the filmstrip scanning station;

(c) upon determining that any previously scanned filmstrip has exited the filmstrip scanning station, advancing the pre-positioned filmstrip from said pre-positioning station and through the filmstrip scanning gate in a forward direction while conducting the pre-scanning operation until all image frames are pre-scanned;

(d) advancing the pre-scanned filmstrip in the reverse direction into the filmstrip scanning gate an image frame at a time to position an image frame for main-scanning;

(e) translating the filmstrip scanning gate and the image frame positioned therein in the forward direction while conducting the main-scan operation and in the reverse direction upon completion of the main-scan operation;

(f) repeating the advancing and translating steps (d) and (e) for positioning and conducting the main-scan operations of the pre-scanned filmstrip image frames to be main-scanned until all such image frames are main-scanned;

(g) advancing the main-scanned filmstrip entirely from the filmstrip scanning station in the reverse direction;

(h) repeating step (a) at any time after the advancement of a previously pre-positioned filmstrip into said scanning station in accordance with step (c) to pre-position the next filmstrip to be scanned; and (h) in the presence of each next pre-positioned filmstrip, repeating steps (b) through (g).

2. The method of claim 1 wherein step (c) further comprises:

detecting the trailing end of the pre-scanned filmstrip while advancing the filmstrip in the forward direction through the film scanning plane; and halting advancement of the filmstrip on detection of the trailing end and completion of the pre-scanning of the filmstrip image frames.

3. The method of claim 2 wherein step (e) further comprises:

clamping the filmstrip image frame flat in the filmstrip scanning gate frame.

4. A film scanner for positioning elongated filmstrips in a film scanning plane of a scanning station for a pre-scan operation and a main-scan operation comprising:

a film scanner housing having an entrance slot for receiving filmstrips inserted for scanning and an exit slot through which scanned filmstrips are ejected;

a pre-positioning station at said entrance slot for receiving inserted filmstrips at the same time that a previously received filmstrip is being scanned;

means for determining that any such previously scanned filmstrip has been advanced from the filmstrip scanning gate and toward said exit slot and providing an advance command in response thereto;

filmstrip transport means responsive to said advance command for advancing the pre-positioned filmstrip through the filmstrip scanning gate in a forward direction while conducting the pre-scanning operation until all image frames are pre-scanned;

means for advancing the pre-scanned filmstrip in the reverse direction into the filmstrip scanning gate an image frame at a time to position an image frame for main-scanning;

means for translating the filmstrip scanning gate and the image frame positioned therein in the forward direction while conducting the main-scan operation and in the reverse direction upon completion of the main-scan operation; and means for advancing the main-scanned filmstrip entirely from the filmstrip scanning gate in the reverse direction upon main-scanning of all image frames of the filmstrip and through the exit slot.

5. The apparatus of claim 4 further comprising:

means for detecting the trailing end of the pre-scanned filmstrip while advancing the filmstrip in the forward direction through the film scanning plane; and means for halting advancement of the filmstrip on completion of the pre-scanning operation of the filmstrip image frames.

6. The apparatus of claim 4 further comprising:

a filmstrip diverter positioned in relation to said pre-positioning station to divert a filmstrip advanced by said filmstrip transport means in the forward direction from said pre-positioning station through said filmstrip scanning gate and to divert a filmstrip advanced in the reverse direction from said filmstrip scanning gate and through said exit slot.

7. A film scanner for scanning image frames of discrete filmstrips or slides advanced into and from a scanning station in a film scanner housing comprising:

a scanner frame;

a scanner assembly supported by said scanner frame and defining the scanning station for scanning the image frames of the filmstrip or slide advanced through the scanning station and deriving image data related to the scanned image frame;

an elongated scanning gate frame having a slide scanning gate in a first frame location along said scanning gate frame for receiving a slide for scanning and having a filmstrip scanning gate in a second frame location along said scanning gate frame for receiving a filmstrip image frame for scanning;

a slide input/output slot in said scanner housing for inserting a slide into said slide scanning gate for scanning and withdrawing a slide from said slide scanning gate on completion of scanning;

a carriage coupled to said elongated scanning gate frame for translating said scanning gate frame with respect to said scanner assembly for selectively positioning said slide scanning gate or said filmstrip scanning gate in said scanning station; and a controller for selectively operating said carriage in a slide scanning operation to translate said slide scanning gate from said slide input/output slot through said scanning station for scanning a slide inserted therein by said scanning assembly and for returning said slide scanning gate to a position in relation to said slide input/output slot on completion of the slide scanning operation.

8. The film scanner of claim 7, wherein:

said film scanner housing has an entrance slot for receiving filmstrips inserted for scanning and an exit slot through which scanned filmstrips are ejected; and further comprising:

a pre-positioning station at said entrance slot for receiving inserted filmstrips for advancement into said filmstrip scanning gate after a previously received filmstrip has completed scanning;

a filmstrip transport mechanism for transporting an inserted filmstrip in a forward direction through said filmstrip scanning station and for transporting the filmstrip in the reverse direction through the filmstrip scanning station and through said exit slot in response to said controller.

9. The film scanner of claim 8, wherein said filmstrip scanning gate further comprises:

a filmstrip image frame having a filmstrip scanning aperture; and a filmstrip image frame clamp operable in a released position for allowing a filmstrip to be transported through said filmstrip scanning gate in said forward and reverse directions and in a clamp position for engaging the filmstrip and clamping image frame flat during a filmstrip scanning operation; and wherein:

said controller further selectively operates said image frame clamp in said clamped position and operates said carriage to translate said filmstrip scanning gate through said scanning station in a filmstrip scanning operation.

10. The film scanner of claim 9 further comprising:

a filmstrip diverter positioned between said slide scanning gate and said filmstrip scanning gate on said scanning gate frame and in relation to said pre-positioning station to divert a filmstrip advanced by said transport mechanism in the forward direction from said pre-positioning station through said filmstrip scanning gate and to divert a filmstrip advanced in the reverse direction from said filmstrip scanning gate and through said exit slot.

11. The film scanner of claim 9 wherein:

said controller further selectively operates said film scanner assembly in a pre-scan operation and a main-scan operation; and said controller positions said image frame clamp in said released position and operates said transport mechanism to transport said filmstrip in said forward direction through said filmstrip scanning gate during said pre-scan operation and in said reverse direction to position each image frame in said filmstrip scanning gate and then operates said image frame clamp in said clamp position.

12. The film scanner of claim 8 further comprising:

a filmstrip diverter positioned between said slide scanning gate and said filmstrip scanning gate on said scanning gate frame and in relation to said pre-positioning station to divert a filmstrip advanced by said transport mechanism in the forward direction from said pre-positioning station through said filmstrip scanning gate and to divert a filmstrip advanced in the reverse direction from said filmstrip scanning gate and through said exit slot.

13. The film scanner of claim 7 wherein:

said scanner assembly further comprises a film scanning plane in said scanning station; and said slide scanning gate further comprises first and second slide mount engaging jaws aligned with said film scanning plane to position the slide film image frame with said film scanning plane when said slide scanning gate is translated into said scanning station.

14. The film scanner of claim 13 wherein said slide scanning gate further comprises:

a slide scanning gate base attached to said scanning gate frame; and pivot links coupled between said base and said jaws for pivotally supporting said jaws apart and in alignment with said film scanning plane; and wherein:

said first and second jaws are shaped to receive and center the slide film image frame with respect to said scanning station irrespective of the width of the slide mount and align the slide film image frame to the film scanning plane irrespective of the thickness of the slide mount.

15. The film scanner of claim 14 wherein said first and second jaws have V-shaped notches and said pivot links support said first and second jaws with said V-shaped notches in facing alignment to one another and with said film scanning plane, whereby opposite slide mount edges are received and self-center into said V-shaped notches.

16. The film scanner of claim 15 further comprising:

a spring member arranged between said base and said links for biasing said V-shaped notches of said first and second jaws toward one another to position said jaws a distance apart less than the nominal width of the slide mounts, whereby insertion of opposite slide mount edges into said V-shaped notches forces said first and second jaws apart equally against the bias of said spring member and self-centers the slide image frame irrespective of the width of the slide inserted.

17. The film scanner of claim 14 further comprising:

a spring member arranged between said base and said links for biasing said first and second jaws toward one another to position said jaws a distance apart less than the nominal width of the slide mounts, whereby insertion of opposite slide mount edges into said shaped first and second jaws apart equally against the bias of said spring member and self-centers the slide image frame irrespective of the width of the slide inserted.

* * * * *

UNITED STATES PATENT AND TRADEMARK OFFICE
CERTIFICATE OF CORRECTION

PATENT : 5,461,492
DATED : October 24, 1995
INVENTOR(S) : Robert S. Jones

It is certified that error appears in the above-identified patent and that said Letters Patent is hereby corrected as shown below:

Column 8, line 48, delete "Docket 68,560" and insert --U.S. Ser. No. 197,775--.

Column 10, line 37, delete "Docket 68,561" and insert --U.S. Ser. No. 197,777--.

Column 11, line 24, delete "Docket 69,483" and insert --U.S. Ser. No. 197,778--.

Column 12, line 61, delete "Docket 68,341" and insert --U.S. Ser. No. 197,774--.

Column 13, line 7, delete "Docket 68,560" and insert --U.S. Ser. No. 197,775--.

Column 13, line 32, delete "Docket 68,560" and insert --U.S. Ser. No. 197,775--.

Column 15, line 64, delete "Docket 69,483" and insert --U.S. Ser. No. 197,778--.

Signed and Sealed this

Third Day of September, 1996

Attest:

BRUCE LEHMAN

*Attesting Officer*  *Commissioner of Patents and Trademarks*